US012598392B2

(12) United States Patent
Kathuria et al.

(10) Patent No.: US 12,598,392 B2
(45) Date of Patent: Apr. 7, 2026

(54) EFFICIENT PROCESSING OF IMAGE DATA FOR GENERATING COMPOSITE IMAGES

(71) Applicant: QUALCOMM Incorporated, San Diego, CA (US)

(72) Inventors: Tarun Kathuria, San Diego, CA (US); Tauseef Kazi, San Diego, CA (US); Xi Zhu, San Diego, CA (US); Nitin Bandwar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 135 days.

(21) Appl. No.: 18/363,379

(22) Filed: Aug. 1, 2023

(65) Prior Publication Data

US 2025/0047985 A1 Feb. 6, 2025

(51) Int. Cl.
*H04N 23/741* (2023.01)
*G06T 1/60* (2006.01)
(Continued)

(52) U.S. Cl.
CPC ............. *H04N 23/741* (2023.01); *G06T 1/60* (2013.01); *H04N 5/265* (2013.01); *H04N 23/71* (2023.01);
(Continued)

(58) Field of Classification Search
CPC ...... H04N 23/741; H04N 5/265; H04N 23/71; H04N 23/84; H04N 23/743; H04N 23/76;
(Continued)

(56) References Cited

U.S. PATENT DOCUMENTS

| | | | |
|---|---|---|---|
| 2006/0171597 A1 | 8/2006 | Yasue | |
| 2009/0213218 A1 | 8/2009 | Cilia et al. | |

(Continued)

FOREIGN PATENT DOCUMENTS

| | | |
|---|---|---|
| CN | 110572584 B | 5/2021 |
| EP | 0360432 A1 | 3/1990 |

(Continued)

OTHER PUBLICATIONS

Amir I., et al., "Three-Dimensional Imaging for Circuit-board Assembly", AT & T Technical Journal, American Telephone and Telegraph Co. New York, US, vol. 71, No. 4, Jul. 1, 1992, pp. 30-36, XP000300836, p. 33, left-hand column-p. 34, left-hand column.

(Continued)

*Primary Examiner* — Ahmed A Berhan
(74) *Attorney, Agent, or Firm* — Polsinelli LLP/QUALCOMM Incorporated

(57) ABSTRACT

Systems and techniques are described herein for processing data. For instance, a method for processing data is provided. The method may include receiving image data; determining at least one mask based on intensities of pixels of the image data, wherein the at least one mask is indicative of pixels of the image data with intensities that meet at least one luminance threshold; and at least one of: processing a portion of the image data based on the at least one mask; storing the portion of the image data in a memory based on the at least one mask; or all of: storing the at least one mask in the memory; reading the at least one mask from the memory; reading the portion of the image data from the memory based on the at least one mask; and processing the portion of the image data read from the memory.

26 Claims, 14 Drawing Sheets

(51) Int. Cl.

| | | |
|---|---|---|
| *H04N 5/265* | (2006.01) | |
| *H04N 23/71* | (2023.01) | |
| *H04N 23/76* | (2023.01) | |
| *H04N 23/84* | (2023.01) | |

(52) U.S. Cl.
CPC ... *H04N 23/84* (2023.01); *G06T 2207/10144* (2013.01); *G06T 2207/20208* (2013.01); *G06T 2207/20221* (2013.01)

(58) Field of Classification Search
CPC ............. G06T 1/60; G06T 2207/10144; G06T 2207/20208; G06T 2207/20221
See application file for complete search history.

(56) References Cited

U.S. PATENT DOCUMENTS

| | | | | |
|---|---|---|---|---|
| 2018/0338078 | A1* | 11/2018 | Cote | .................. H04N 23/6811 |
| 2019/0095710 | A1* | 3/2019 | Rees | ......................... G06T 5/94 |

| | | | |
|---|---|---|---|
| 2020/0160493 | A1 | 5/2020 | Lakemond |
| 2021/0350597 | A1 | 11/2021 | Vembar et al. |
| 2022/0256073 | A1 | 8/2022 | Zhao et al. |
| 2023/0005294 | A1 | 1/2023 | Rivard et al. |
| 2023/0038325 | A1 | 2/2023 | Fenney |

FOREIGN PATENT DOCUMENTS

| | | |
|---|---|---|
| JP | 2005270577 A | 10/2005 |
| WO | 2005004062 A2 | 1/2005 |

OTHER PUBLICATIONS

International Search Report and Written Opinion—PCT/US2024/031491—ISA/EPO—Sep. 4, 2024.
Kyo S., et al., "Mapping Schemes of Image Recognition Tasks onto Highly Parallel SIMD/MIMD Processors", 2009 Third ACM/IEEE International Conference on Distributed Smart Cameras (ICDSC), IEEE, Piscataway, NJ, USA, Aug. 30, 2009, 6 Pages, XP031548051, p. 4, left-hand column, figure 6.

* cited by examiner

400

Backend 414

Memory 316

Frontend 402

Image Sensor 302

Memory 430

600

612

614

Thresh.
608

Thresh.
610

Gate 308

Bayer Trans.
606

602

604

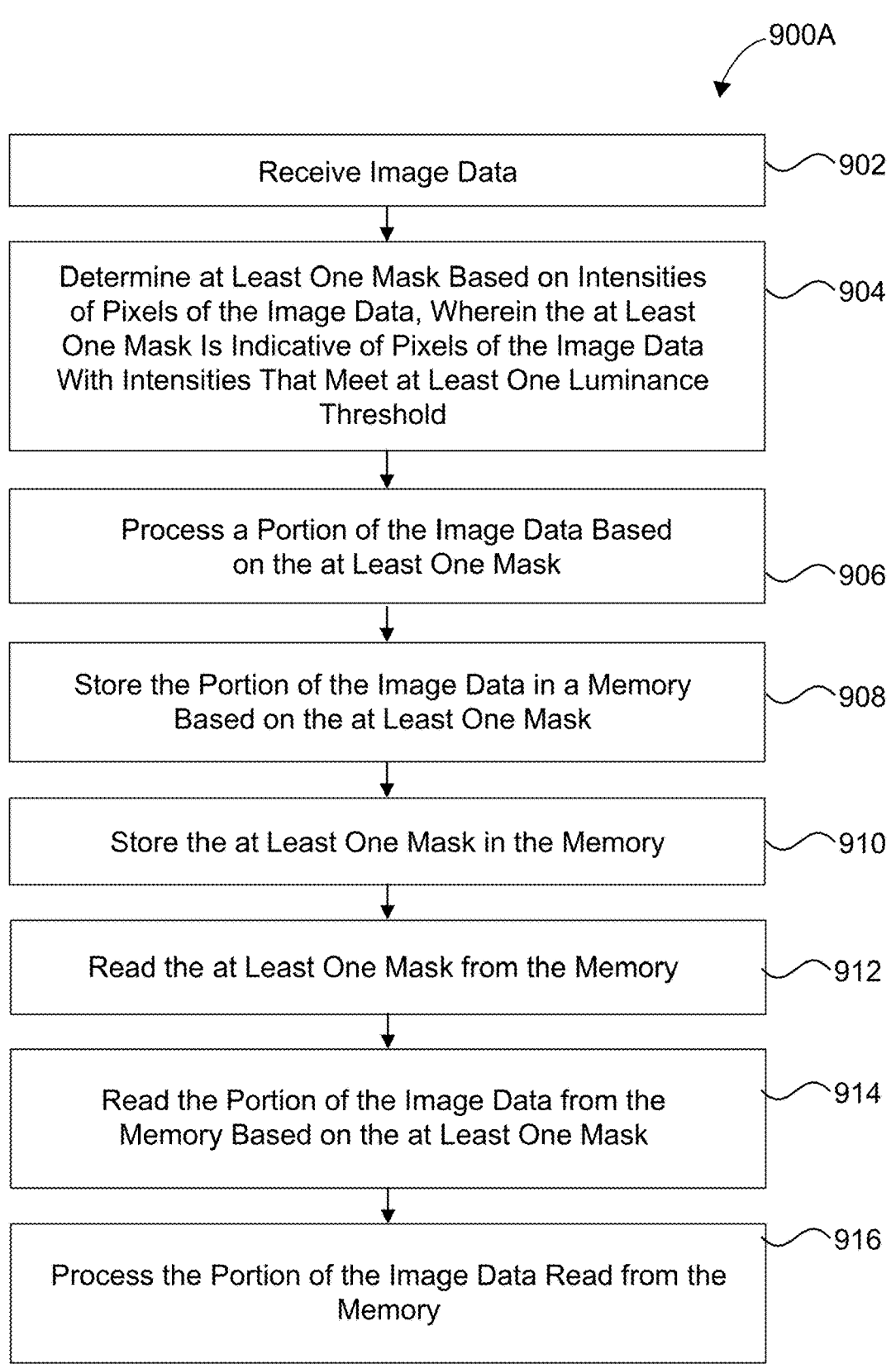

900A

Receive Image Data — 902

Determine at Least One Mask Based on Intensities of Pixels of the Image Data, Wherein the at Least One Mask Is Indicative of Pixels of the Image Data With Intensities That Meet at Least One Luminance Threshold — 904

Process a Portion of the Image Data Based on the at Least One Mask — 906

Store the Portion of the Image Data in a Memory Based on the at Least One Mask — 908

Store the at Least One Mask in the Memory — 910

Read the at Least One Mask from the Memory — 912

Read the Portion of the Image Data from the Memory Based on the at Least One Mask — 914

Process the Portion of the Image Data Read from the Memory — 916

Receive Image Data — 902

Determine at Least One Mask Based on Intensities of Pixels of the Image Data, Wherein the at Least One Mask Is Indicative of Pixels of the Image Data With Intensities That Meet at Least One Luminance Threshold — 904

Process a Portion of the Image Data Based on the at Least One Mask — 906

900C

Receive Image Data ⟋902

Determine at Least One Mask Based on Intensities of Pixels of the Image Data, Wherein the at Least One Mask Is Indicative of Pixels of the Image Data With Intensities That Meet at Least One Luminance Threshold ⟋904

Store a Portion of the Image Data in a Memory Based on the at Least One Mask ⟋908

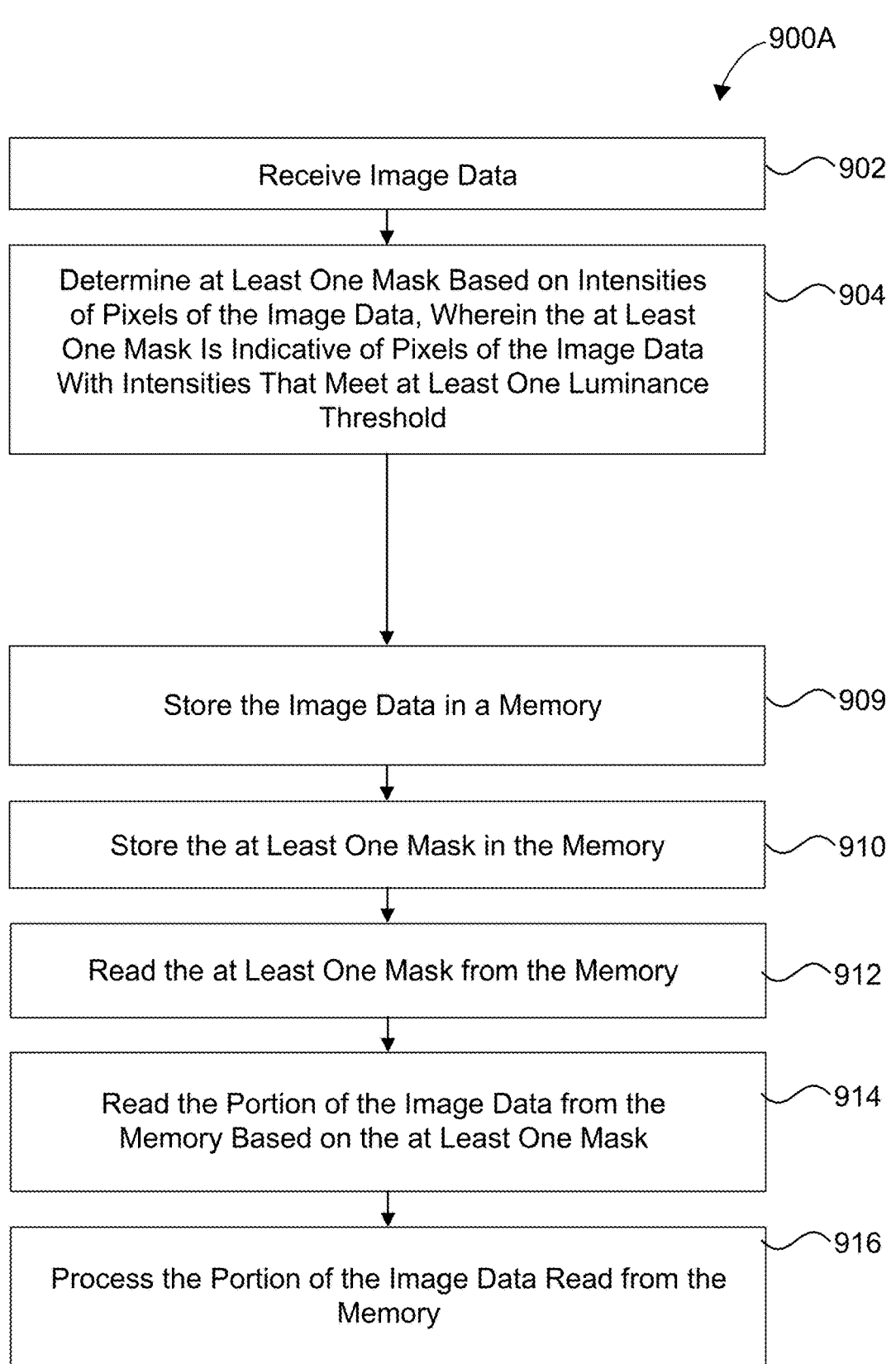

900A

Receive Image Data — 902

Determine at Least One Mask Based on Intensities of Pixels of the Image Data, Wherein the at Least One Mask Is Indicative of Pixels of the Image Data With Intensities That Meet at Least One Luminance Threshold — 904

Store the Image Data in a Memory — 909

Store the at Least One Mask in the Memory — 910

Read the at Least One Mask from the Memory — 912

Read the Portion of the Image Data from the Memory Based on the at Least One Mask — 914

Process the Portion of the Image Data Read from the Memory — 916

FIG. 9D

EFFICIENT PROCESSING OF IMAGE DATA FOR GENERATING COMPOSITE IMAGES

TECHNICAL FIELD

The present disclosure generally relates to efficient processing of image data for generating composite images. For example, aspects of the present disclosure include systems and techniques for receiving image data, gating pixels of the image data, and processing the image data based on the gating. In some aspects the gated pixels are not processed (e.g., at a frontend image signal processor ISP). In some aspects the gated pixels are not stored at a memory between the frontend ISP and a backend ISP. In some aspects, a mask indicative of the gated pixels is stored along with the image data in the memory. In such aspects, the mask may be read by the backend ISP and the gated pixels may not be read at the backend ISP based on the mask.

BACKGROUND

A camera is a device that receives light and captures image frames, such as still images or video frames, using an image sensor. Cameras can be configured with a variety of image-capture settings and/or image-processing settings to alter the appearance of images captured thereby. Image-capture settings may be determined and applied before and/or while an image is captured, such as ISO, exposure time (also referred to as exposure, exposure duration, or shutter speed), aperture size, (also referred to as f/stop), focus, and gain (including analog and/or digital gain), among others. Moreover, image-processing settings can be configured for post-processing of an image, such as alterations to contrast, brightness, saturation, sharpness, levels, curves, and colors, among others. In some cases, a camera can capture multiple images of a scene using different image-capture settings and can combine the captured images into a single image frame.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

Systems and techniques are described herein for processing data. According to at least one example, an apparatus for processing data is provided. The apparatus includes a memory and one or more processors coupled to the memory. The one or more processors are configured to: receive image data; determine at least one mask based on intensities of pixels of the image data, wherein the at least one mask is indicative of pixels of the image data with intensities that meet at least one luminance threshold; and at least one of: process a portion of the image data based on the at least one mask; store the portion of the image data in a memory based on the at least one mask; or all of: store the at least one mask in the memory; read the at least one mask from the memory; read the portion of the image data from the memory based on the at least one mask; and process the portion of the image data read from the memory.

In another example, a method for processing data is provided. The method includes: receiving image data; determining at least one mask based on intensities of pixels of the image data, wherein the at least one mask is indicative of pixels of the image data with intensities that meet at least one luminance threshold; and at least one of: processing a portion of the image data based on the at least one mask; storing the portion of the image data in a memory based on the at least one mask; or all of: storing the at least one mask in the memory; reading the at least one mask from the memory; reading the portion of the image data from the memory based on the at least one mask; and processing the portion of the image data read from the memory.

In another example, a non-transitory computer-readable medium is provided that has stored thereon instructions that, when executed by at least one processor, cause the at least one processor to: receive image data; determine at least one mask based on intensities of pixels of the image data, wherein the at least one mask is indicative of pixels of the image data with intensities that meet at least one luminance threshold; and at least one of: process a portion of the image data based on the at least one mask; store the portion of the image data in a memory based on the at least one mask; or all of: store the at least one mask in the memory; read the at least one mask from the memory; read the portion of the image data from the memory based on the at least one mask; and process the portion of the image data read from the memory.

As another example, an apparatus is provided. The apparatus includes means for receiving image data; means for determining at least one mask based on intensities of pixels of the image data, wherein the at least one mask is indicative of pixels of the image data with intensities that meet at least one luminance threshold; and at least one of: means for processing a portion of the image data based on the at least one mask; means for storing the portion of the image data in a memory based on the at least one mask; or all of: means for storing the at least one mask in the memory; means for reading the at least one mask from the memory; means for reading the portion of the image data from the memory based on the at least one mask; and means for processing the portion of the image data read from the memory.

According to at least one example, an apparatus for processing data is provided. The apparatus includes a memory and one or more processors coupled to the memory. The one or more processors are configured to: receive image data; determine at least one mask based on intensities of pixels of the image data, wherein the at least one mask is indicative of pixels of the image data with intensities that meet at least one luminance threshold; and process a portion of the image data based on the at least one mask.

In another example, a method for processing data is provided. The method includes: receiving image data; determining at least one mask based on intensities of pixels of the image data, wherein the at least one mask is indicative of pixels of the image data with intensities that meet at least one luminance threshold; and processing a portion of the image data based on the at least one mask.

In another example, a non-transitory computer-readable medium is provided that has stored thereon instructions that, when executed by at least one processor, cause the at least one processor to: receive image data; determine at least one mask based on intensities of pixels of the image data, wherein the at least one mask is indicative of pixels of the image data with intensities that meet at least one luminance threshold; and process a portion of the image data based on the at least one mask.

As another example, an apparatus is provided. The apparatus includes means for receiving image data; means for determining at least one mask based on intensities of pixels of the image data, wherein the at least one mask is indicative of pixels of the image data with intensities that meet at least one luminance threshold; and means for processing a portion of the image data based on the at least one mask.

According to at least one example, an apparatus for processing data is provided. The apparatus includes a memory and one or more processors coupled to the memory. The one or more processors are configured to: receive image data; determine at least one mask based on intensities of pixels of the image data, wherein the at least one mask is indicative of pixels of the image data with intensities that meet at least one luminance threshold; and store a portion of the image data in a memory based on the at least one mask.

In another example, a method for processing data is provided. The method includes: receiving image data; determining at least one mask based on intensities of pixels of the image data, wherein the at least one mask is indicative of pixels of the image data with intensities that meet at least one luminance threshold; and storing a portion of the image data in a memory based on the at least one mask.

In another example, a non-transitory computer-readable medium is provided that has stored thereon instructions that, when executed by at least one processor, cause the at least one processor to: receive image data; determine at least one mask based on intensities of pixels of the image data, wherein the at least one mask is indicative of pixels of the image data with intensities that meet at least one luminance threshold; and store a portion of the image data in a memory based on the at least one mask.

As another example, an apparatus is provided. The apparatus includes means for receiving image data; means for determining at least one mask based on intensities of pixels of the image data, wherein the at least one mask is indicative of pixels of the image data with intensities that meet at least one luminance threshold; and means for storing a portion of the image data in a memory based on the at least one mask.

According to at least one example, an apparatus for processing data is provided. The apparatus includes a memory and one or more processors coupled to the memory. The one or more processors are configured to: receive image data; determine at least one mask based on intensities of pixels of the image data, wherein the at least one mask is indicative of pixels of the image data with intensities that meet at least one luminance threshold; store the image data in a memory; store the at least one mask in the memory; read the at least one mask from the memory; read a portion of the image data from the memory based on the at least one mask; and process the portion of the image data read from the memory.

In another example, a method for processing data is provided. The method includes: receiving image data; determining at least one mask based on intensities of pixels of the image data, wherein the at least one mask is indicative of pixels of the image data with intensities that meet at least one luminance threshold; storing the image data in a memory; storing the at least one mask in the memory; reading the at least one mask from the memory; reading a portion of the image data from the memory based on the at least one mask; and processing the portion of the image data read from the memory.

In another example, a non-transitory computer-readable medium is provided that has stored thereon instructions that, when executed by at least one processor, cause the at least one processor to: receive image data; determine at least one mask based on intensities of pixels of the image data, wherein the at least one mask is indicative of pixels of the image data with intensities that meet at least one luminance threshold; store the image data in a memory; store the at least one mask in the memory; read the at least one mask from the memory; read a portion of the image data from the memory based on the at least one mask; and process the portion of the image data read from the memory.

As another example, an apparatus is provided. The apparatus includes means for receiving image data; means for determining at least one mask based on intensities of pixels of the image data, wherein the at least one mask is indicative of pixels of the image data with intensities that meet at least one luminance threshold; means for storing the image data in a memory; means for storing the at least one mask in the memory; means for reading the at least one mask from the memory; means for reading a portion of the image data from the memory based on the at least one mask; and means for processing the portion of the image data read from the memory.

In some aspects, one or more of the apparatuses described herein is, can be part of, or can include a mobile device (e.g., a mobile telephone or so-called "smart phone", a tablet computer, or other type of mobile device), an extended reality device (e.g., a virtual reality (VR) device, an augmented reality (AR) device, or a mixed reality (MR) device), a vehicle (or a computing device or system of a vehicle), a smart or connected device (e.g., an Internet-of-Things (IoT) device), a wearable device, a personal computer, a laptop computer, a video server, a television (e.g., a network-connected television), a robotics device or system, or other device. In some aspects, each apparatus can include an image sensor (e.g., a camera) or multiple image sensors (e.g., multiple cameras) for capturing one or more images. In some aspects, each apparatus can include one or more displays for displaying one or more images, notifications, and/or other displayable data. In some aspects, each apparatus can include one or more speakers, one or more light-emitting devices, and/or one or more microphones. In some aspects, each apparatus can include one or more sensors. In some cases, the one or more sensors can be used for determining a location of the apparatuses, a state of the apparatuses (e.g., a tracking state, an operating state, a temperature, a humidity level, and/or other state), and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative examples of the present application are described in detail below with reference to the following figures:

FIGS. 9A-9D are flow diagrams illustrating example processes for processing data, in accordance with aspects of the present disclosure.

DETAILED DESCRIPTION

Figure 1:
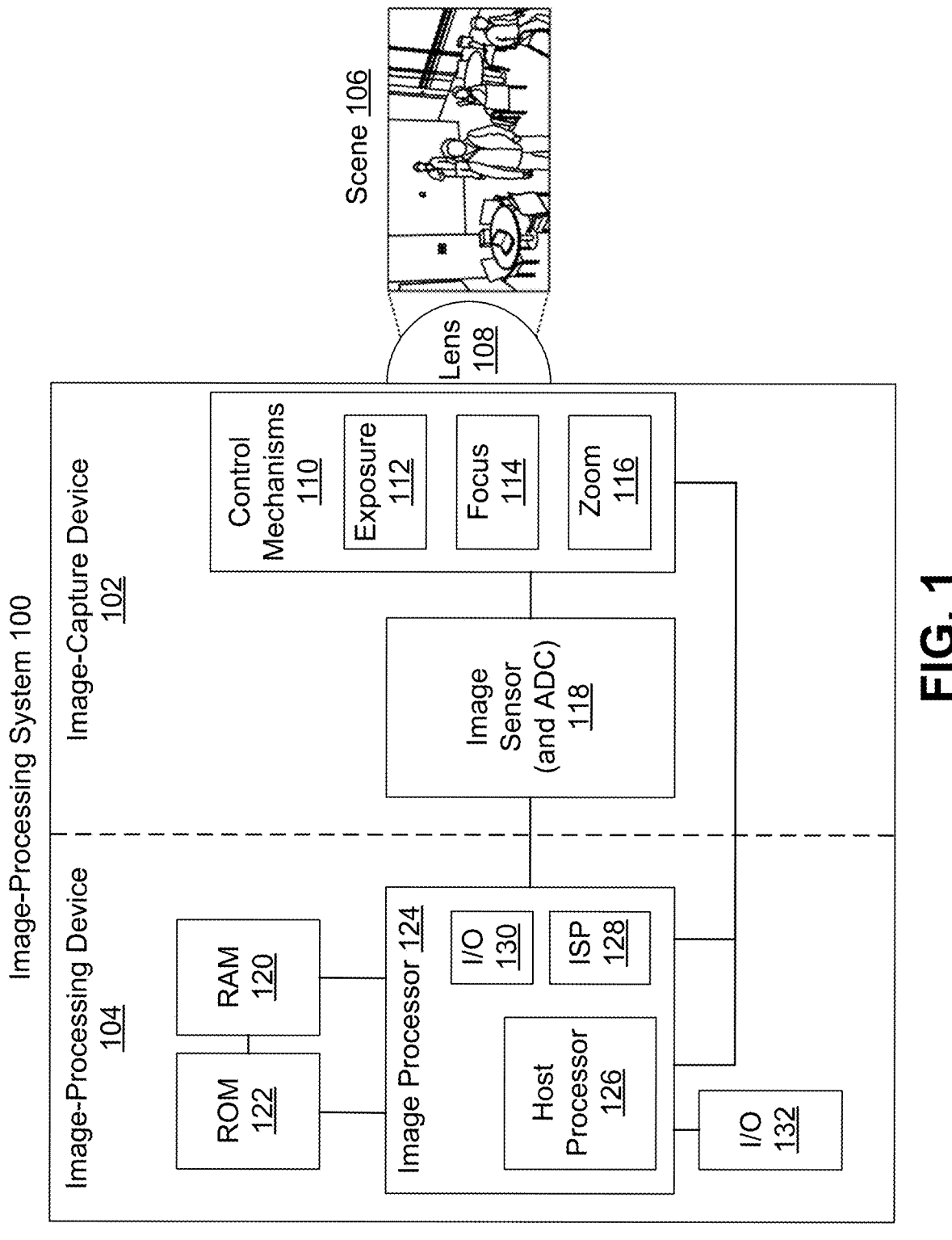
FIG. 1 is a block diagram illustrating an example architecture of an image-processing system, according to various aspects of the present disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the exemplary aspects will provide those skilled in the art with an enabling description for implementing an exemplary aspect. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage, or mode of operation.

Electronic devices (e.g., mobile phones, wearable devices (e.g., smart watches, smart glasses, etc.), tablet computers, extended reality (XR) devices (e.g., virtual reality (VR) devices, augmented reality (AR) devices, mixed reality (MR) devices, and the like), connected devices, laptop computers, etc.) are increasingly equipped with camera hardware to capture image frames, such as still images and/or video frames, for consumption. For example, an electronic device can include a camera to allow the electronic device to capture a video or image of a scene, a person, an object, etc. Additionally, cameras themselves are used in a number of configurations (e.g., handheld digital cameras, digital single-lens-reflex (DSLR) cameras, worn camera (including body-mounted cameras and head-borne cameras), stationary cameras (e.g., for security and/or monitoring), vehicle-mounted cameras, etc.).

A camera is a device that can receive light and captures image frames (e.g., still images or video frames) using an image sensor. In some examples, a camera may include one or more processors, such as image signal processors (ISPs), that can process one or more image frames captured by an image sensor. For example, a raw image frame captured by an image sensor can be processed by an image signal processor (ISP) of a camera to generate a final image. In some cases, an electronic device implementing a camera can further process a captured image or video for certain effects (e.g., compression, image enhancement, image restoration, scaling, framerate conversion, etc.) and/or certain applications such as computer vision, extended reality (e.g., augmented reality, virtual reality, and the like), object detection, image recognition (e.g., face recognition, object recognition, scene recognition, etc.), feature extraction, authentication, and automation, among others.

Cameras can be configured with a variety of image-capture settings and/or image-processing settings to alter the appearance of an image. Image-capture settings can be determined and applied before or while an image is captured, such as ISO, exposure time (also referred to as exposure, exposure duration, and/or shutter speed), aperture size (also referred to as f/stop), focus, and gain, among others. Image-processing settings can be configured for post-processing of an image, such as alterations to a contrast, brightness, saturation, sharpness, levels, curves, and colors, among others.

In photography, the term "exposure," relating to an image captured by a camera, refers to the amount of light per unit area that reaches a photographic film, or in modern cameras, an electronic image sensor (e.g., including an array of photodiodes). The exposure is based on certain image-capture settings such as, for example, exposure time, and/or lens aperture, as well as the luminance of the scene being photographed. Because of the relationship between the amount of light that reaches an image sensor and the duration of time the image sensors is allowed to capture the light, in the present disclosure, the terms "exposure." "exposure duration," and "exposure time" may refer to a duration of time during which the electronic image sensor is exposed to light (e.g., while the electronic image sensor is capturing an image). Many cameras are equipped with an automatic exposure or "auto exposure" mode, where the image-capture settings (e.g., exposure time, lens aperture, etc.) of the camera may be automatically adjusted to match, as closely as possible, the luminance of a scene or subject being photographed. In some cases, an automatic exposure control (AEC) engine can perform AEC to determine image-capture settings for an image sensor.

In photography and videography, a technique called high dynamic range (HDR) allows the dynamic range of image frames captured by a camera to be increased beyond the native capability of the camera. In this context, the term "dynamic range" refers to the range of luminosity between the brightest area and the darkest area of the scene or image frame. For example, a high dynamic range means there is large variation in light levels within a scene or an image frame. HDR can involve capturing multiple image frames of a scene with different exposures and combining captured image frames with the different exposures into a single image frame. The combination of image frames with different exposures can result in an image with a dynamic range higher than that of each individual image frame captured and combined to form the HDR image frame. For example, the electronic device can create a high dynamic range scene by combining two or more exposure frames into a single frame. HDR is a feature often used by electronic devices, such as smartphones and mobile devices, for various purposes. For example, in some cases, a smartphone can use HDR to achieve a better image quality or an image quality similar to the image quality achieved by a digital single-lens reflex (DSLR) camera.

In the present disclosure, the term "combine," and like terms, with reference to images or image data, may refer to any suitable techniques for using information (e.g., pixels) from two or more images to generate an image (e.g., a "composite" image). For example, pixels from a first image and pixels from a second image may be combined to generate a composite image. In such cases some of the pixels of the composite image may be from the first image and others of the pixels of the composite image may be from the second image. In some cases, some of the pixels from the first image and the second image may be merged, fused, or blended. For example, color and/or intensity values for pixels of the composite image may be based on respective pixels from both the first image and the second image. For instance, a given pixel of the composite image may be based on an average, or a weighted average, between a corresponding pixel of the first image and a corresponding pixel of the second image (e.g., the corresponding pixels of the first image and the second image may be blended). As one example, a central region of a first image may be included in a composite image. Further, an outer region of a second of a second image may be included in the composite image. Pixels surrounding the central region in the composite image may be based on weighted averages between corresponding pixels of the first image and corresponding pixels of the second image. In other words, pixels of the first image surrounding the central region may be merged, fused, or blended with pixels of the second image inside the outer region.

In some cases, an imaging device can generate an HDR image by combining multiple images that captured with different image-capture settings. For instance, an imaging device can generate an HDR image by combining a short-exposure image captured with a short exposure time and a long-exposure image captured with a long exposure time that is longer than the short exposure time. As another example, the imaging device can create an HDR image using a short-exposure image, a medium exposure image (that is capture with a medium exposure time that is between the short exposure time and the long exposure time), and a long-exposure image.

Because short-exposure images are generally dark, they preserve the most detail in the highlights (bright areas) of a photographed scene. Medium-exposure images and the long-exposure images are generally brighter than short-exposure images, and may be overexposed (e.g., too bright to make out details) in the highlight portions (bright areas) of the scene. Because long-exposure images generally include bright portions, they may preserve detail in the shadows (dark areas) of a photographed scene. Medium-exposure images and the short-exposure images are generally darker than long-exposure images, and may be underexposed (e.g., too dark to make out details in) in the shadow portions (dark areas) of the scene, making their depictions of the shadows too dark to observe details. To generate an HDR image, the imaging device may, for example, use portions of the short-exposure image to depict highlights (bright areas) of the photographed scene, use portions of the long-exposure image depicting shadows (dark areas) of the scene, and use portions of the medium-exposure image depicting other areas (other than highlights and shadows) of a scene.

A camera may include an image-capture device (or portion) including one or more image sensors that may capture light and generate raw image frames based thereon. The camera may include in image-processing device (or portion) including one or more image signal processors (ISPs) that may process the raw image frames. The image-processing device (or portion) may include a frontend portion and a backend portion. The image-capture device (or portion) may stream raw image data to the frontend portion of the image-processing device (or portion). The frontend portion may perform one or more operations on the raw image data. For example, the frontend portion may perform one or more operations related to Bad Pixel Correction (BPC), lens correction, phase-detection pixel correction, demosaicing, lateral chromatic aberration correction, Bayer filtering, adaptive Bayer filtering, tone mapping, noise reduction, etc. The frontend portion may provide processed image frames to the backend portion, for example, by writing the processed image frames to a memory, such as a double data rate (DDR) synchronous dynamic random-access memory (SDRAM) or any other memory device. The backend portion can retrieve the processed image frames from the memory and further process the image frames. For example, the backend portion may perform one or more operations related to noise reduction, tone mapping, and/or motion stabilization, etc. on the processed image frames. In the case of HDR, the backend portion may combine multiple raw image frames to generate a single composite image frame.

The write and/or read operations used to create the HDR image can result in significant power, bandwidth, and/or time consumption. For example, generating an HDR image based on two image frames of a scene can increase (e.g., double) a required data throughput (e.g., between the image-capture device and the image-processing device), as compared with generating a single non-HDR image. Such an increase in required data throughput can increase latency and power consumption of a device in generating HDR images. Further, an image-processing device processing two image frames of a scene, instead of a single image frame of the scene, can increase data processing, memory requirements, and/or power consumption of the camera. Such an increase in data processing, memory requirements, and/or power consumption can impact battery life of devices.

Systems, apparatuses, methods (also referred to as processes), and computer-readable media (collectively referred to herein as "systems and techniques") are described herein for efficiently processing image data (e.g., for generating composite images). For example, the systems and techniques described herein may receive image data (e.g., two or more image frames, such as a short-exposure image, and a long-exposure image). The systems and techniques may determine at least one mask based on intensities of pixels of the image data. The at least one mask may be indicative of pixels of the image data with intensities that meet at least one luminance threshold. For example, the at least one mask may be indicative of pixels of a first image frame of the image data (e.g., a short-exposure image) with an intensity that is greater than a darkness threshold. Further, the at least one mask may be indicative of pixels of a second image frame of the image data (e.g., a long-exposure image) with an intensity that is less than a brightness threshold.

In some cases, the systems and techniques may process (at a frontend portion) the image data based on the at least one mask. For example, the systems and techniques may process a portion of the first image frame (e.g., pixels of the first image frame with an intensity that is greater than a darkness threshold, as indicated by the at least one mask) and a portion of the second image frame (e.g., pixels of the second image frame with an intensity that is less than a brightness threshold, as indicated by the at least one mask). Further, the systems and techniques may not process pixels of the image data that do not meet the luminance threshold. For example, the systems and techniques may not process pixels of the first image frame (e.g., the short-exposure image) with intensities that are less than the darkness threshold. Further, the systems and techniques may not process pixels of the second image frame (e.g., the long-exposure image) with intensities that are greater than the brightness threshold. For example, the systems and techniques may not process over-exposed pixels of the long-exposure image and/or under-exposed pixels of the short-exposure image.

Further, the systems and techniques may store at the image data in a memory between the frontend portion and a backend portion. In some cases, the systems and techniques may store the image data in the memory based on the at least one mask. For example, the systems and techniques may store a portion of the first image frame (e.g., pixels of the first image frame with an intensity that is greater than a darkness threshold, as indicated by the at least one mask) and a portion of the second image frame (e.g., pixels of the second image frame with an intensity that is less than a brightness threshold, as indicated by the at least one mask) in the memory. In some cases, the systems and techniques may not store pixels of the image data that do not meet the luminance threshold in the memory. For example, the systems and techniques may not store pixels of the first image frame (e.g., the short-exposure image) with intensities that are less than the darkness threshold. Further, the systems and techniques may not store pixels of the second image frame (e.g., the long-exposure image) with intensities that are greater than the brightness threshold. For example, the systems and techniques may not store under-exposed pixels of the first image frame or over-exposed pixels of the second image frame in the memory.

The systems and techniques may read the stored image data from the memory and further process the image data. In some cases, the systems and techniques may read the image data from the memory based on the at least one mask. For example, the systems and techniques may receive the at least one mask (e.g., by reading the at least one mask from the memory) and read data from the memory according to the at least one mask. In some cases, the systems and techniques may store the entirety of the image data in the memory and reading the image data according to the at least one mask may include reading only the pixels with intensities that satisfy the at least one luminance threshold based on the at least one mask. For example, the systems and techniques may read the pixels of the first image frame (e.g., the short-exposure image) with intensities that are greater than the darkness threshold and the pixels of the second image frame (e.g., the long-exposure image) with intensities that are less than the brightness threshold. In other cases, the systems and techniques may have stored only the pixels with intensities that satisfy the at least one luminance threshold in the memory. In such cases, reading the image data according to the at least one mask may include using the mask to identify where in the memory to locate the stored pixels or how to correlate the read data to positions of the pixels within the image frames. In either case, reading the image data according to the at least one mask may prevent the systems and techniques from reading pixels that do not meet at least one luminance threshold from the memory. Further, the systems and techniques may process the read image data. As an example of processing the image data, the systems and techniques my generate a composite image based on the image data (e.g., based on the first image frame and the second image frame).

The systems and techniques may receive the image data, determine the at least one mask, process the image data, and store at least a portion of the image data (e.g., some or all of the image data) at, or using, a frontend ISP of an image-processing system. The systems and techniques may store at least the portion of the image data in a memory that is used to transfer image data from the frontend ISP to backend ISP of the image-processing system. The systems and techniques may process the image data read from the memory at the backend ISP.

By processing, storing, and/or reading a portion of the image data (rather than an entirety of the image data), the systems and techniques may conserve power, bandwidth, and/or processing time. For example, by processing a portion of the image data at the frontend ISP (rather than the entirety of the image data), the systems and techniques may conserve power. Additionally or alternatively, by storing a portion of the image data (rather than the entirety of the image data), the systems and techniques may conserve power, bandwidth and/or processing time between the frontend ISP and the memory. Additionally, or alternatively, by reading a portion of the image data (rather than the entirety of the image data), the systems and techniques may conserve power, bandwidth and/or processing time between the memory and the backend ISP. In some cases, the systems and techniques may further allow for a reduction in one or more voltage levels (e.g., voltage levels of a system on a chip (SoC), such as a SoC including one or more ISPs).

Various aspects of the application will be described with respect to the figures below.

FIG. 1 is a block diagram illustrating an example architecture of an image-processing system 100, according to various aspects of the present disclosure. The image-processing system 100 includes various components that are used to capture and process images, such as an image of a scene 106. The image-processing system 100 can capture image frames (e.g., still images or video frames). In some cases, the lens 108 and image sensor 118 (which may include an analog-to-digital converter (ADC)) can be associated with an optical axis. In one illustrative example, the photosensitive area of the image sensor 118 (e.g., the photodiodes) and the lens 108 can both be centered on the optical axis.

In some examples, the lens 108 of the image-processing system 100 faces a scene 106 and receives light from the scene 106. The lens 108 bends incoming light from the scene toward the image sensor 118. The light received by the lens 108 then passes through an aperture of the image-processing system 100. In some cases, the aperture (e.g., the aperture size) is controlled by one or more control mechanisms 110. In other cases, the aperture can have a fixed size.

The one or more control mechanisms 110 can control exposure, focus, and/or zoom based on information from the image sensor 118 and/or information from the image processor 124. In some cases, the one or more control mechanisms 110 can include multiple mechanisms and components. For example, the control mechanisms 110 can include one or more exposure-control mechanisms 112, one or more focus-control mechanisms 114, and/or one or more zoom-control mechanisms 116. The one or more control mechanisms 110 may also include additional control mechanisms besides those illustrated in FIG. 1. For example, in some cases, the one or more control mechanisms 110 can include control mechanisms for controlling analog gain, flash, HDR, depth of field, and/or other image capture properties.

The focus-control mechanism 114 of the control mechanisms 110 can obtain a focus setting. In some examples, focus-control mechanism 114 stores the focus setting in a memory register. Based on the focus setting, the focus-control mechanism 114 can adjust the position of the lens 108 relative to the position of the image sensor 118. For example, based on the focus setting, the focus-control mechanism 114 can move the lens 108 closer to the image sensor 118 or farther from the image sensor 118 by actuating a motor or servo (or other lens mechanism), thereby adjusting the focus. In some cases, additional lenses may be included in the image-processing system 100. For example, the image-processing system 100 can include one or more microlenses over each photodiode of the image sensor 118. The microlenses can each bend the light received from the lens 108 toward the corresponding photodiode before the light reaches the photodiode.

In some examples, the focus setting may be determined via contrast detection autofocus (CDAF), phase detection autofocus (PDAF), hybrid autofocus (HAF), or some combination thereof. The focus setting may be determined using the control mechanism 110, the image sensor 118, and/or the image processor 124. The focus setting may be referred to as an image capture setting and/or an image processing setting. In some cases, the lens 108 can be fixed relative to the image sensor and the focus-control mechanism 114.

The exposure-control mechanism 112 of the control mechanisms 110 can obtain an exposure setting. In some cases, the exposure-control mechanism 112 stores the exposure setting in a memory register. Based on the exposure setting, the exposure-control mechanism 112 can control a size of the aperture (e.g., aperture size or f/stop), a duration of time for which the aperture is open (e.g., exposure time or shutter speed), a duration of time for which the sensor collects light (e.g., exposure time or electronic shutter speed), a sensitivity of the image sensor 118 (e.g., ISO speed or film speed), analog gain applied by the image sensor 118, or any combination thereof. The exposure setting may be referred to as an image capture setting and/or an image processing setting.

The zoom-control mechanism 116 of the control mechanisms 110 can obtain a zoom setting. In some examples, the zoom-control mechanism 116 stores the zoom setting in a memory register. Based on the zoom setting, the zoom-control mechanism 116 can control a focal length of an assembly of lens elements (lens assembly) that includes the lens 108 and one or more additional lenses. For example, the zoom-control mechanism 116 can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 108 in some cases) that receives the light from the scene 106 first, with the light then passing through a focal zoom system between the focusing lens (e.g., lens 108) and the image sensor 118 before the light reaches the image sensor 118. The focal zoom system may, in some cases, include two positive (e.g., converging, convex) lenses of equal or similar focal length (e.g., within a threshold difference of one another) with a negative (e.g., diverging, concave) lens between them. In some cases, the zoom-control mechanism 116 moves one or more of the lenses in the focal zoom system, such as the negative lens and one or both of the positive lenses. In some cases, zoom-control mechanism 116 can control the zoom by capturing an image from an image sensor of a plurality of image sensors (e.g., including image sensor 118) with a zoom corresponding to the zoom setting. For example, the image-processing system 100 can include a wide-angle image sensor with a relatively low zoom and a telephoto image sensor with a greater zoom. In some cases, based on the selected zoom setting, the zoom-control mechanism 116 can capture images from a corresponding sensor.

The image sensor 118 includes one or more arrays of photodiodes or other photosensitive elements. Each photodiode measures an amount of light that eventually corresponds to a particular pixel in the image produced by the image sensor 118. In some cases, different photodiodes may be covered by different filters. In some cases, different photodiodes can be covered in color filters, and may thus measure light matching the color of the filter covering the photodiode. Various color filter arrays can be used such as, for example and without limitation, a Bayer color filter array, a quad color filter array (QCFA), and/or any other color filter array.

In some cases, the image sensor 118 may alternately or additionally include opaque and/or reflective masks that block light from reaching certain photodiodes, or portions of certain photodiodes, at certain times and/or from certain angles. In some cases, opaque and/or reflective masks may be used for phase detection autofocus (PDAF). In some cases, the opaque and/or reflective masks may be used to block portions of the electromagnetic spectrum from reaching the photodiodes of the image sensor (e.g., an IR cut filter, a UV cut filter, a band-pass filter, low-pass filter, high-pass filter, or the like). The image sensor 118 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 110 may be included instead or additionally in the image sensor 118. The image sensor 118 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

Figure 10:
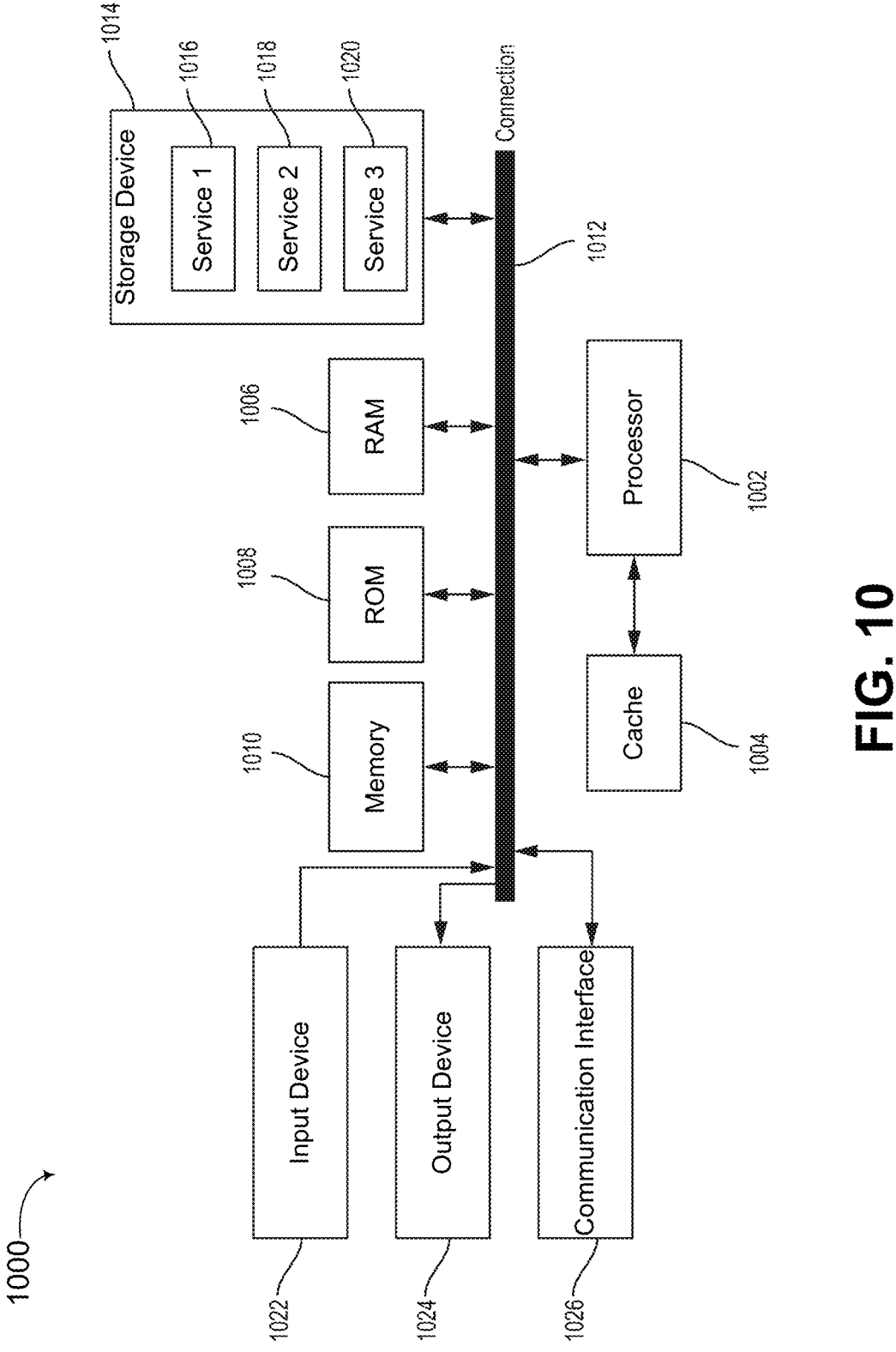
FIG. 10 is a block diagram illustrating an example computing-device architecture of an example computing device which can implement the various techniques described herein.

The image processor 124 may include one or more processors, such as one or more image signal processors (ISPs) (including ISP 128), one or more host processors (including host processor 126), and/or one or more of any other type of processor discussed with respect to the computing-device architecture 1000 of FIG. 10. The host processor 126 can be a digital signal processor (DSP) and/or other type of processor. In some implementations, the image processor 124 is a single integrated circuit or chip (e.g., referred to as a system-on-chip or SoC) that includes the host processor 126 and the ISP 128. In some cases, the chip can also include one or more input/output ports (e.g., input/output (I/O) ports 130), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 130 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General-Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 126 can communicate with the image sensor 118 using an I2C port, and the ISP 128 can communicate with the image sensor 118 using an MIPI port.

The image processor 124 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 124 may store image frames and/or processed images in random-access memory (RAM) 120, read-only memory (ROM) 122, a cache, a memory unit, another storage device, or some combination thereof.

Various input/output (I/O) devices 132 may be connected to the image processor 124. The I/O devices 132 can include a display screen, a keyboard, a keypad, a touchscreen, a trackpad, a touch-sensitive surface, a printer, any other output devices, any other input devices, or any combination thereof. In some cases, a caption may be input into the image-processing device 104 through a physical keyboard or keypad of the I/O devices 132, or through a virtual keyboard or keypad of a touchscreen of the I/O devices 132. The I/O devices 132 may include one or more ports, jacks, or other connectors that enable a wired connection between the image-processing system 100 and one or more peripheral devices, over which the image-processing system 100 may receive data from the one or more peripheral device and/or transmit data to the one or more peripheral devices. The I/O devices 132 may include one or more wireless transceivers that enable a wireless connection between the image-processing system 100 and one or more peripheral devices, over which the image-processing system 100 may receive data from the one or more peripheral device and/or transmit data to the one or more peripheral devices. The peripheral devices may include any of the previously-discussed types of the I/O devices 132 and may themselves be considered I/O devices 132 once they are coupled to the ports, jacks, wireless transceivers, or other wired and/or wireless connectors.

In some cases, the image-processing system 100 may be a single device. In some cases, the image-processing system 100 may be two or more separate devices, including an image-capture device 102 (e.g., a camera) and an image-processing device 104 (e.g., a computing device coupled to the camera). In some implementations, the image-capture device 102 and the image-capture device 102 may be coupled together, for example via one or more wires, cables, or other electrical connectors, and/or wirelessly via one or more wireless transceivers. In some implementations, the image-capture device 102 and the image-processing device 104 may be disconnected from one another.

As shown in FIG. 1, a vertical dashed line divides the image-processing system 100 of FIG. 1 into two portions that represent the image-capture device 102 and the image-processing device 104, respectively. The image-capture device 102 includes the lens 108, control mechanisms 110, and the image sensor 118. The image-processing device 104 includes the image processor 124 (including the ISP 128 and the host processor 126), the RAM 120, the ROM 122, and the I/O device 132. In some cases, certain components illustrated in the image-capture device 102, such as the ISP 128 and/or the host processor 126, may be included in the image-capture device 102. In some examples, the image-processing system 100 can include one or more wireless transceivers for wireless communications, such as cellular network communications, 802.11 wi-fi communications, wireless local area network (WLAN) communications, or some combination thereof.

The image-processing system 100 can be part of, or implemented by, a single computing device or multiple computing devices. In some examples, the image-processing system 100 can be part of an electronic device (or devices) such as a camera system (e.g., a digital camera, an IP camera, a video camera, a security camera, etc.), a telephone system (e.g., a smartphone, a cellular telephone, a conferencing system, etc.), a laptop or notebook computer, a tablet computer, a set-top box, a smart television, a display device, a game console, an XR device (e.g., an HMD, smart glasses, etc.), an IoT (Internet-of-Things) device, a smart wearable device, a video streaming device, an Internet Protocol (IP) camera, or any other suitable electronic device(s).

While the image-processing system 100 is shown to include certain components, one of ordinary skill will appreciate that the image-processing system 100 can include more components than those shown in FIG. 1. The components of the image-processing system 100 can include software, hardware, or one or more combinations of software and hardware. For example, in some implementations, the components of the image-processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image-processing system 100.

In some examples, the computing-device architecture 1000 shown in FIG. 10 and further described below can include the image-processing system 100, the image-capture device 102, the image-processing device 104, or a combination thereof.

In some examples, the image-processing system 100 can create an HDR image using multiple image frames with different exposures. For example, the image-processing system 100 can create an HDR image using a short exposure (SE) image, a medium exposure (ME) image, and a long exposure (LE) image. As another example, the image-processing system 100 can create an HDR image using an SE image and an LE image. In some cases, the image-capture device 102 can write the different image frames to a memory device, such RAM 120. Image-processing device

104 can then retrieve the image frames and combine them into a single image. As previously explained, the different write and read operations used to create the HDR image can result in significant power and bandwidth consumption.

Figure 2:
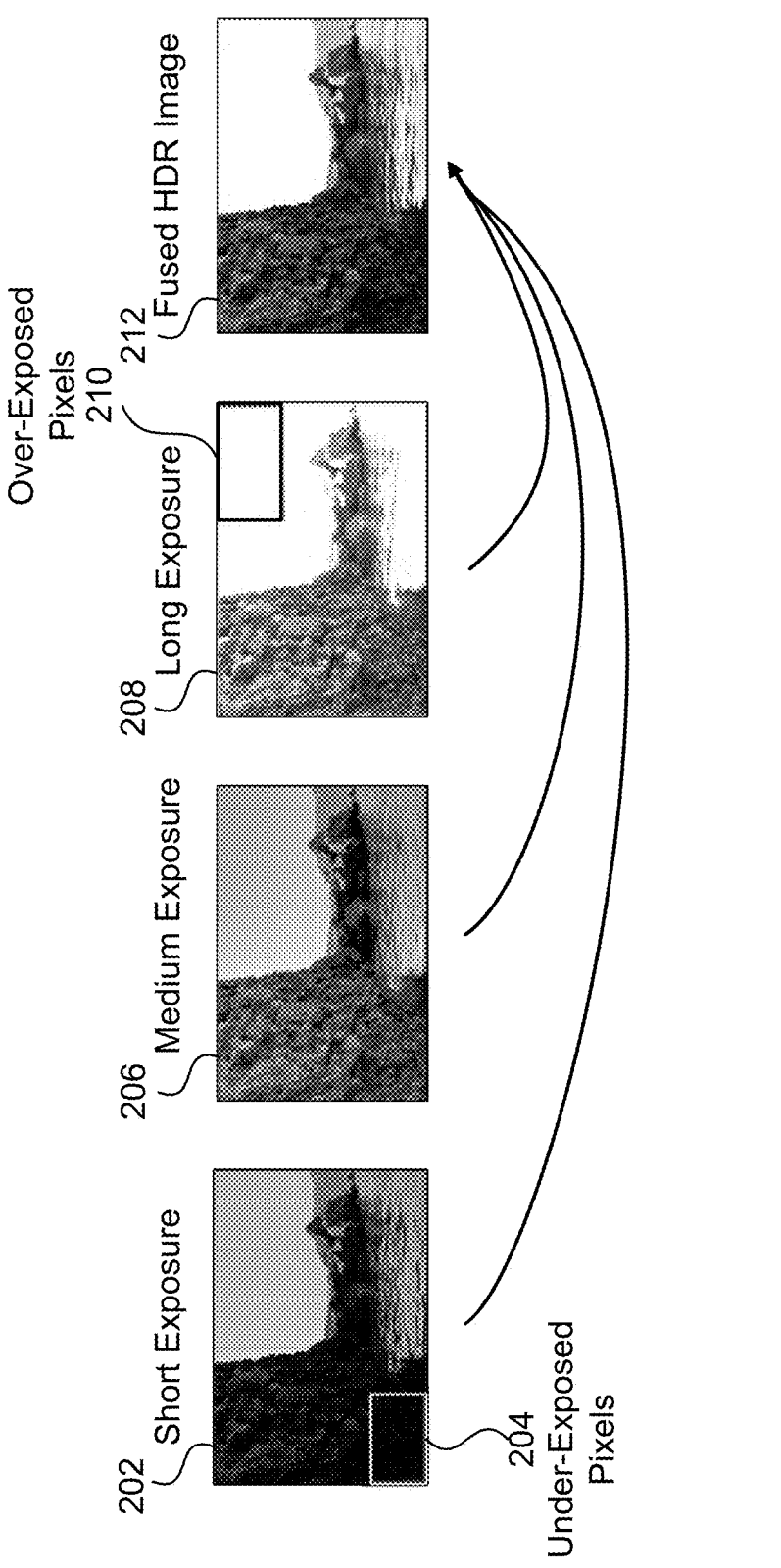
FIG. 2 is a diagram illustrating example images providing context for a description of generating composite images, according to various aspects of the present disclosure.

When creating an HDR image, over-exposed pixels of a long-exposure image and under-exposed pixels of a short-exposure image generally do not contribute to the final HDR image. For example, FIG. 2 illustrates multiple images with different exposures used to create a fused HDR image (e.g., HDR image 212). In particular, FIG. 2 shows a short-exposure image 202, a medium-exposure image 206, a long-exposure image 208, and an HDR image 212 generated by combining together the short-exposure image 202, the medium-exposure image 206, and the long-exposure image 208. The short-exposure image 202 includes under-exposed pixels 204, and the long-exposure image 208 includes over-exposed pixels 210. As shown in FIG. 2, the under-exposed pixels 204 in the short-exposure image 202 and the over-exposed pixels 210 in the long-exposure image 208 do not contribute to the pixels of the HDR image 212. In some cases, when creating the HDR image 212, the image-processing system 100 writes the under-exposed pixels 204 in the short-exposure image 202 and the over-exposed pixels 210 in the long-exposure image 208 from a camera frontend engine(s) of the image-processing system 100 (e.g., a portion of the ISP 128 with a hard-wire connection to the image sensor 118) to a memory device, reads them back from the memory device (e.g., via an offline image processing engine, such as a portion of the ISP 128 that obtains image data from the camera frontend engine(s) via the memory device, such as DDR), and processes the pixels of the three images (e.g., short-exposure image 202, medium-exposure image 206, and long-exposure image 208) to create the HDR image 212. The operations to read, write, and process the under-exposed pixels 204 in the short-exposure image 202 and the over-exposed pixels 210 in the long-exposure image 208 contribute to the overall power and bandwidth consumption of the image-processing system 100 when creating the HDR image 212, even though such pixels do not contribute to the HDR image 212.

Figure 3:
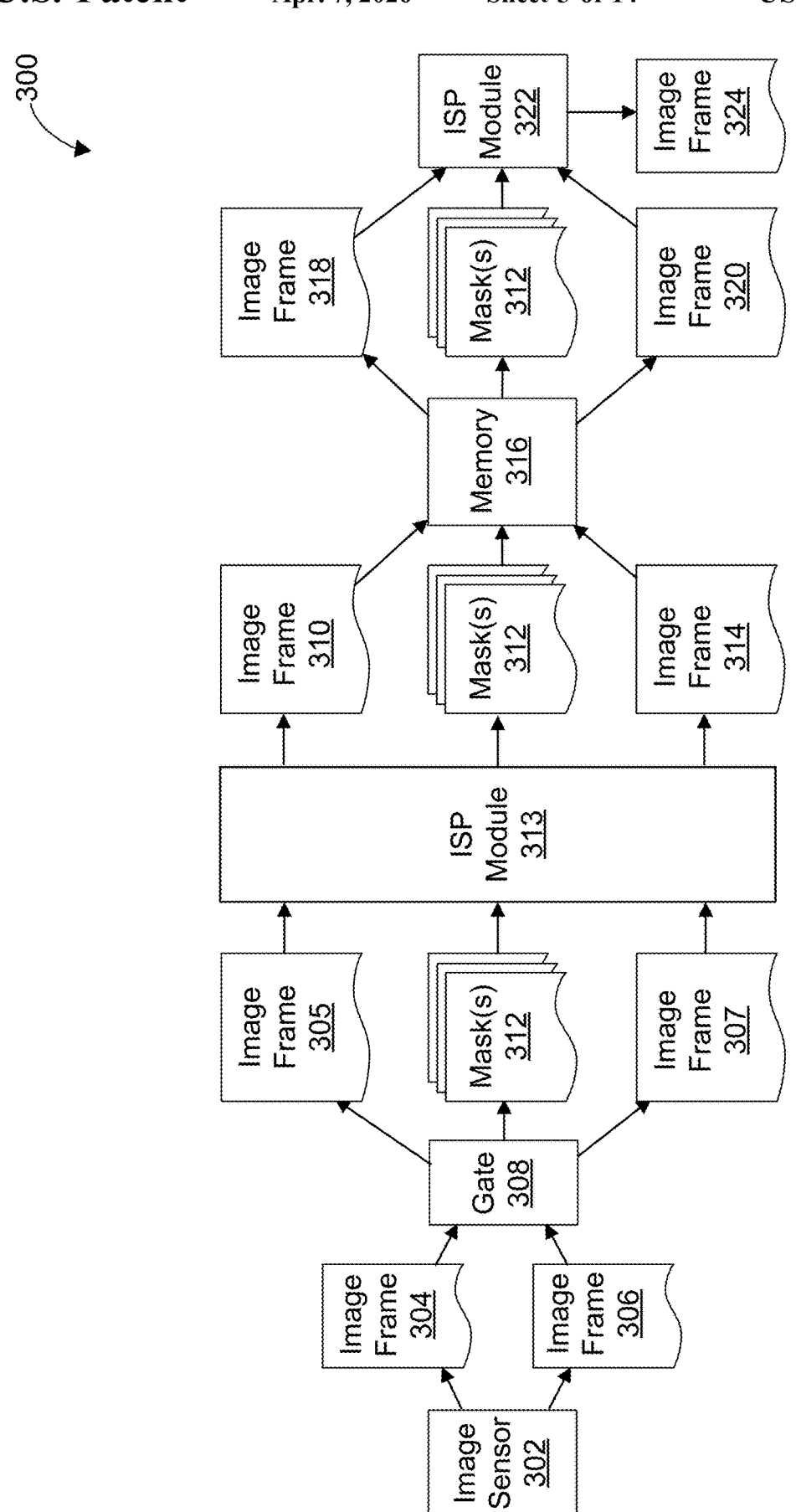
FIG. 3 is a diagram illustrating an example system that may efficiently process image data, according to various aspects of the present disclosure.

FIG. 3 is a diagram illustrating an example system 300 that may efficiently process image data (e.g., image frame 304 and image frame 306), according to various aspects of the present disclosure. System 300 may receive image data (e.g., image frame 304 and image frame 306) from an image sensor 302. System 300 may include gate 308 which may determine one or more mask(s) 312 based on the image data (e.g., based on image frame 304 and/or image frame 306). System 300 may include an image-signal processing (ISP) module 313 which may be used to process the image data (e.g., image frame 305 and/or image frame 307 to generate image frame 310 and/or image frame 314 respectively). In some cases, ISP module 313 may process image frame 305 and/or image frame 307 based on mask(s) 312. System 300 may include a memory 316 in which system 300 may store the image data (e.g., image frame 310, and/or image frame 314) and/or mask(s) 312. In some cases, system 300 may store image frame 310 and/or image frame 314 in memory 316 based on mask(s) 312. System 300 may include an ISP module 322 which may read the image data (e.g., image frame 318 and/or image frame 320) from memory 316. In some cases, ISP module 322 may read mask(s) 312 from memory and read image frame 318 and/or image frame 320 from memory based on mask(s) 312. ISP module 322 may process image frame 318 and/or image frame 320 to generate image frame 324. System 300 may efficiently process the image data by determining what data to process at ISP module 313, what data to write to memory 316, and/or read from memory 316 to conserve bandwidth, power, and/or processing time.

Image sensor 302 may include one or more image sensors and may generate image data (e.g., image frame 304 and image frame 306) based on light received by the image sensors. Image sensor 302 may be an example of image sensor 118 of FIG. 1 or of image-capture device 102 of FIG. 1. Image sensor 302 is optional in system 300. For example, image sensor 302 may be included in system 300 or image sensor 302 may be external to system 300 and yet provide image frame 304 and image frame 306 to system 300.

Image frame 304 and image frame 306 are provided as examples of image data. While two image frames are illustrated in FIG. 3, the image data processed by system 300 may include any number of individual frames (e.g., one, two, three, or four frames). For descriptive purposes, image frame 304 may be described as a short-exposure image and image frame 306 may be described as a long-exposure image. For example, the exposure duration used to capture image frame 306 may be longer than the exposure duration used to capture image frame 304. As such, image frame 306 may be brighter than image frame 304. Further, image frame 306 may include over-exposed pixels and image frame 304 may include under-exposed pixels. Short-exposure image 202 of FIG. 2 may be an example of image frame 304 and long-exposure image 208 of FIG. 2 may be an example of image frame 306.

Gate 308 may be a module (e.g., an image-signal processing module) implemented in an image signal processor. Gate 308 may receive the image data (e.g., image frame 304 and image frame 306) and may generate one or more mask(s) 312 based on the image data. For example, gate 308 may generate mask(s) 312 to be indicative of pixels of the image data that meet at least one luminance threshold. For example, gate 308 may include a brightness threshold and a darkness threshold. Gate 308 may determine which pixels of image frame 304 are more intense than the darkness threshold and which pixels of image frame 306 are less intense than the brightness threshold. As another example, gate 308 may determine which pixels of image frame 304 are under-exposed and which pixels of image frame 306 are over-exposed (the under-exposed pixels and the over-exposed pixels may be pixels that do not meet at least one luminance threshold).

In some cases, mask(s) 312 may include a first mask corresponding to image frame 304 and a second mask corresponding to image frame 306. For example, the first mask may include a number of bits (e.g., arranged to correspond to pixels of image frame 304). Each of the bits of the mask may be indicative of whether corresponding pixels of image frame 304 meet a corresponding luminance threshold or not (e.g., whether the corresponding pixels are brighter than a darkness threshold). Similarly, the second mask may include a number of bits (e.g., arranged to correspond to pixels of image frame 306). Each of the bits of the mask may be indicative of whether corresponding pixels of image frame 306 meet the luminance threshold or not (e.g., whether the corresponding pixels are darker than a brightness threshold).

In other cases, mask(s) 312 may include a single mask related to both image frame 304 and image frame 306. For example, the single mask may include a number of values (e.g., arranged to correspond to pixels of both image frame 304 and image frame 306). Each of the values of the mask may be indicative of whether the corresponding pixels of image frame 304 and image frame 306 meet respective luminance thresholds or not. For example, for a given pixel of image frame 304 and a corresponding pixel of image frame 306, a value of 0 may indicate that neither of the pixels meet their respective luminance threshold, a value of 1 or 2 may indicate that one of the pixels meet their respective luminance threshold, and a value of 3 may indicate that both of the pixels meet their respective luminance threshold.

In some cases, gate 308 may gate the image data to generate gated image data. For example, gate 308 may alter image frame 304 such that only pixels of image frame 304 that are more intense than the darkness threshold are included in image frame 305. Further, gate 308 may alter image frame 306 such that only pixels of image frame 306 that are less intense than the brightness threshold to are included in image frame 307. In such cases, image frame 305 may represent only a portion of image frame 304 and image frame 307 may represent only a portion of image frame 306. In the present disclosure, the term "gate" when used as a verb, may refer to selecting a portion (or in some cases all) of input data for inclusion in output data according to a threshold. In other cases, gate 308 may not gate the image data. In such cases, image frame 305 may be the same as image frame 304 and image frame 307 may be the same as image frame 306.

ISP module 313 may process image frame 305 and image frame 307 to generate image frame 310 and image frame 314 respectively. ISP module 313 may perform one or more operations related to Bad Pixel Correction (BPC), lens correction, phase-detection pixel correction, demosaicing, lateral chromatic aberration correction, Bayer filtering, adaptive Bayer filtering, tone mapping, noise reduction, etc. In some cases, ISP module 313 may process image frame 305 and/or image frame 307 based on mask(s) 312. For example, ISP module 313 may operate on pixels of image frame 305 and image frame 307 as identified by mask(s) 312. Further, ISP module 313 may not operate on pixels of image frame 305 and/or image frame 307 not identified by mask(s) 312. ISP module 313 is optional in system 300. For example, in some cases, system 300 may omit ISP module 313. In such cases, image frame 310 may be the same as image frame 305 and image frame 314 may be the same as image frame 307.

Gate 308 and ISP module 313 may be implemented in a frontend of an image-processing system. For example, gate 308 and ISP module 313 may be implemented in a frontend ISP. For instance, gate 308 and ISP module 313 may be implemented in a frontend portion of image processor 124 of FIG. 1.

System 300 may store mask(s) 312 and the image data (e.g., image frame 310 and/or image frame 314) (whether gated or not) in memory 316. Memory 316 may be accessible to both the frontend and a backend of the image-processing system. For example, memory 316 may be intended to implement data transfer between the frontend and backend. Memory 316 may be, or may include, a double data rate (DDR) synchronous dynamic random-access memory (SDRAM) or any other memory device. RAM 120 of FIG. 1 may be an example of memory 316. In some cases, system 300 may store image data (e.g., image frame 305 and image frame 307) in memory 316 based on mask(s) 312. For example, in some cases, system 300 may store pixels of image frame 305 and/or image frame 307 that are identified by mask(s) 312. Further, system 300 may not store unidentified pixels of image frame 305 and/or image frame 307 in memory 316. In some cases, before, or as part of, writing the image data to memory 316, system 300 may compress the image data (and/or mask(s) 312). For example, system 300 may compress the image data using universal bandwidth compression (UBWC) to save bandwidth.

ISP module 322 may be implemented in a backend of an image-processing system. For example, ISP module 322 may be implemented in a backend ISP. For instance, ISP module 322 may be implemented in in a backend portion of image processor 124 of FIG. 1. ISP module 322 may read the image data (e.g., image frame 318 and/or image frame 320) from memory 316. In some cases, ISP module 322 may read the image data according to mask(s) 312. For example, ISP module 322 may read mask(s) 312 from memory 316. Further, ISP module 322 may read the image data (e.g., image frame 318 and/or image frame 320) from memory 316 according to mask(s) 312.

In cases in which gate 308 gated the image data, and/or cases in which system 300 stored the image data according to mask(s) 312, image frame 318 may be the same as image frame 310 and/or image frame 320 may be the same as image frame 314. In such cases, ISP module 322 may read every pixel of the image data stored in memory 316. In such cases, ISP module 322 may use mask(s) 312 to determine the positions of the pixels (e.g., the position of the pixels in memory 316 and/or the positions of the pixels in an image frame). For example, in some cases, when gate 308 stores image frame 310 in memory 316, gate 308 may write values for each of the pixels of image frame 310 in a two-dimensional data format (e.g., as pixels) and ignore values between written values. As such, whatever values occupied spaces in memory 316 between written values of image frame 310 may persist (such values may be termed "junk" with regard to image frame 310). ISP module 322 may use mask(s) 312 to determine which values to read to read only the written values of image frame 310 (e.g., and to not read junk values). Additionally, or alternatively, ISP module 322 may use mask(s) 312 to determine a mapping between read values and an image frame. For example, in some cases, gate 308 may write all values of image frame 310 sequentially in memory 316 (e.g., not skipping spaces in memory 316 for gated values of image frame 310). ISP module 322 may read the sequential values and use mask(s) 312 to map the read values to positions of image frame 318.

In cases in which gate 308 does not gate the image data and/or cases in which system 300 does not store the image data according to mask(s) 312 (e.g., such that image frame 310 is the same as image frame 304 and image frame 314 is the same as image frame 306), in reading image data from memory 316 according to mask(s) 312, ISP module 322 may gate the image data. For example, system 300 may write the entirety of image frame 310 and image frame 314 (which may be the same as image frame 304 and image frame 306 respectively) into memory 316. Mask(s) 312 may indicate pixels of image frame 310 and image frame 314 that meet their respective luminance thresholds. ISP module 322 may read the values for only the pixels that meet their respective luminance thresholds from memory 316. In this way, image frame 318 may be a gated version of image frame 310 and image frame 320 may be a gated version of image frame 314. In reading the image data, ISP module 322 may use mask(s) 312 to determine a mapping between read values and an image frame.

In some cases, ISP module 322 may process the image data (e.g., image frame 318 and/or image frame 320). For example, ISP module 322 may generate a composite image (e.g., image frame 324) based on image frame 318 and image frame 320. Additionally, or alternatively, ISP module 322 may perform one or more operations related to noise-reduction, tone-mapping, and/or motion-compensation etc. on image frame 318 and/or image frame 320.

By processing image frame 305 and/or image frame 307 at ISP module 313 based on mask(s) 312 (e.g., only processing some pixels of each of image frame 305 and image frame 307) rather than processing an entirety of image frame 304 and/or image frame 306, system 300 may conserve power. Additionally or alternatively, by storing image frame 310 and/or image frame 314 (e.g., gated versions of image frame 304 and/or image frame 306 respectively) rather than the entirety of image frame 304 and/or image frame 306, system 300 may conserve power, bandwidth and/or time between image sensor 302 and memory 316. Additionally, or alternatively, by reading image frame 318 and/or image frame 320 (e.g., gated versions of image frame 304 and/or image frame 306 respectively rather than the entirety of image frame 304 and/or image frame 306, system 300 may conserve power, bandwidth and/or time between memory 316 and ISP module 322.

Figure 4A:
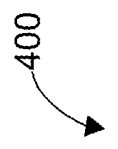
FIG. 4A is a block diagram illustrating an example of data flow in a camera system, according to various aspects of the present disclosure.

FIG. 4A is a block diagram illustrating an example of data flow in a camera system (e.g., image-processing system 100 of FIG. 1), according to various aspects of the present disclosure. In particular, FIG. 4A is a diagram illustrating an example of a system 400 for a camera showing the data flow. In FIG. 4A, system 400 is shown to include a sensor 302 (e.g., a camera sensor subsystem for obtaining image frames capturing scenes), a frontend 402 (e.g., an inline image processor, which may be referred to as an image front end (IFE)), and a backend 414 (e.g., an offline image processor which may be referred to as an offline processing engine or image processing engine (IPE)). Image sensor 302, frontend 402, and backend 414 are all shown to be in communication with memory 316.

During operation of system 400, image sensor 302 may provide image data (e.g., as a stream pixels) to frontend 402 (e.g., an image front-end camera component, which can be a component in the system on a chip (SoC)). In some cases, image sensor 302 may provide image data to frontend 402 via a Mobile Industry Processor Interface (MIPI). In other cases, system 400 may include a memory 430. In such cases, sensor 302 may write image data (e.g., a stream of pixels) to memory 430 and frontend 402 may read the image data (e.g., the stream of pixels) from memory 430. In any case, after frontend 402 receives the pixels from image sensor 302, frontend 402 can process the pixels (e.g., by processing the pixels one line at a time). After frontend 402 has processed one or more of the lines of the image frame, the frontend 402 can transfer the processed sensor data to memory 316. Backend 414 can read the image frames from memory 316. In some cases, the processing by frontend 402 may be referred to as inline processing because frontend 402 may process the pixels in line with the operation of the image sensor 302 (e.g., as the pixels are received from image sensor 302 via the MIPI). In other cases, the processing by frontend 402 may be referred to as offline processing because frontend 402 may process the image data after reading the image data from memory 430.

Figure 4B:
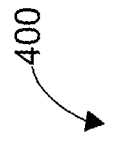
FIG. 4B is a diagram illustrating an example system that may efficiently process image data, according to various aspects of the present disclosure.

FIG. 4B is a diagram illustrating an example system 400 that may efficiently process image data (e.g., image frame 304 and image frame 306), according to various aspects of the present disclosure. System 400 may include frontend 402, backend 414, and memory 316 in which frontend 402 may store data and from which backend 414 can read the data. System 400 may efficiently process the image data by determining what data to process at frontend 402, what data to write to memory 316, and/or what data to read from memory 316 to conserve bandwidth, power, and/or processing time.

Frontend 402 may include gate 308 and ISP module 313. As described above, gate 308 may receive the image data (e.g., image frame 304 and image frame 306). In some cases, gate 308 may receive image frame 304 and image frame 306 directly from image sensor 302 (e.g., via a MIPI interface). In other cases, gate 308 may receive image frame 304 and image frame 306 from image sensor 302 via a memory 430. In any case, gate 308 may generate one or more mask(s) 312 based on the image data. As described above, mask(s) 312 may be indicative of pixels of the image data that meet at least one luminance threshold. Further, gate 308 may gate image frame 304 to generate image frame 305 and gate image frame 306 to generate image frame 307. As such, image frame 305 may be a gated version of image frame 304 and image frame 307 may be a gated version of image frame 306. Gate 308 may provide mask(s) 312, image frame 305, and/or image frame 307 to ISP module 313. Alternatively, in some cases, gate 308 may generate mask(s) 312 and not gate image frame 304 and image frame 306. In such cases, image frame 305 may be the same as image frame 304 and image frame 307 may be the same as image frame 306.

ISP module 313 may perform one or more operations on the image data (e.g., on image frame 305 and/or image frame 307). For example, ISP module 313 may Bad Pixel Correction (BPC), lens correction, phase-detection pixel correction, demosaicing, lateral chromatic aberration correction, Bayer filtering, adaptive Bayer filtering, tone mapping, noise reduction, etc. on image frame 305 and image frame 307. In cases in which gate 308 gated image frame 305 and image frame 307 prior to providing image frame 305 and image frame 307 to ISP module 313, frontend 402 may conserve power when processing image frame 305 and image frame 307 at ISP module 313. For example, ISP module 313 may process a portion (e.g., the gated portion of image frame 304 and image frame 306) rather than the entirety of image frame 304 and image frame 306 which may conserve computing operations and power. In some cases (e.g., cases in which gate 308 does not gate image frame 304 and image frame 306, and in which image frame 305 is the same as image frame 304 and image frame 307 is the same as image frame 306), ISP module 313 may process image frame 305 and image frame 307 based on mask(s) 312 such that ISP module 313 processes pixels indicated by mask(s) 312 and not pixels not indicated by mask(s) 312. In such cases, ISP module 313 may conserve power based on the pixels not processed.

Image frame 310 may be the product of the operations of ISP module 313 performed on image frame 305 and image frame 314 may be the product of the operations of ISP module 313 performed on image frame 307. Because image frame 305 and image frame 307 were gated, image frame 310 and image frame 314 may be gated (e.g., to exclude pixels that do not meet the luminance thresholds). Frontend 402 may store mask(s) 312, image frame 310, and/or image frame 314 in memory 316. By storing image frame 310 and image frame 314 (which are gated and thus only a portion of image frame 304 and image frame 306 respectively) in memory 316 (instead of storing image frame 304 and image frame 306 (or processed versions of image frame 304 and image frame 306)) system 400 may conserve bandwidth, power, and/or computing time. In some cases (e.g., cases in which gate 308 does not gate image frame 304 and image frame 306, and in which image frame 305 is the same as image frame 304 and image frame 307 is the same as image frame 306), frontend 402 may store image frame 310 and image frame 314 based on mask(s) 312 such that frontend 402 stores pixels indicated by mask(s) 312 and not pixels not indicated by mask(s) 312. In such cases, frontend 402 may conserve power and bandwidth between frontend 402 and memory 316 based on the pixels not processed.

As described above, ISP module 322 may read the image data (e.g., image frame 318 and image frame 320) from memory 316. In some cases (e.g., cases in which gate 308 gated image frame 304 and image frame 306 and/or cases in which frontend 402 stored only a portion of image frame 310 and/or a portion of image frame 314 in memory 316), ISP module 322 may read all the stored image data from memory 316. In such cases, ISP module 322 may read the image data according to mask(s) 312. For example, ISP module 322 may use mask(s) 312 to locate valid pixels of image frame 310 and image frame 314 in memory 316. Additionally, or alternatively, ISP module 322 may use mask(s) 312 to determine positions of the pixels in a read image frame. As described above, image frame 310 may be a gated (and processed, e.g., as processed by ISP module 313) version of image frame 304 and image frame 314 may be a gated (and processed, e.g., as processed by ISP module 313) version of image frame 306. By reading image frame 318 and image frame 320 (which are gated and thus only a portion of image frame 304 and image frame 306 respectively) from memory 316 (instead of reading image frame 304 and image frame 306 (or processed versions of image frame 304 and image frame 306)) system 400 may conserve bandwidth, power, and/or computing time. In other cases (e.g., cases in which gate 308 did not gate image frame 304 and image frame 306 and frontend 402 stored all of image frame 310 and image frame 314 in memory 316), memory 316 may read image frame 318 and image frame 320 from memory 316 based on mask(s) 312. For example, ISP module 322 may read portions of image frame 310 and image frame 314 form memory as image frame 318 and image frame 320 based on mask(s) 312. For example, ISP module 322 may read pixels of image frame 310 (as indicated by mask(s) 312) from memory 316 as image frame 318 and pixels of image frame 314 (as indicated by mask(s) 312) from memory 316 as image frame 320. By reading only portions of image frame 310 and image frame 314 from memory 316 (instead of reading image frame 304 and image frame 306 (or processed versions of image frame 304 and image frame 306)) system 400 may conserve bandwidth, power, and/or computing time.

In some cases, when reading image frame 318 and image frame 320 from memory 316, ISP module 322 may read pixels from image frame 318 in place of gated pixels of image frame 320 and/or read pixels from image frame 320 in place of gated pixels of image frame 318. For example, where image frame 318 includes gaps (e.g., based on pixels being gated, based on the pixels being under exposed) ISP module 322 may read corresponding pixels from image frame 320 (e.g., based on mask(s) 312). As another example, where image frame 320 includes gaps (e.g., based on pixels being gated, based on the pixels being over exposed) ISP module 322 may read corresponding pixels from image frame 318 (e.g., based on mask(s) 312). Such replacements during read operations may conserve operations (and thus power) when generating composite images.

In some cases, ISP module 322 may generate image frame 324 (which may be a composite image) based on image frame 318 and image frame 320. ISP module 322 may provide image frame 324 to further ISPs for further operations. For example, ISP module 322 may provide image frame 324 to ISP 412 which may perform feature detection, as an example. In some cases, ISP module 322 may write image frame 324 to a memory (not illustrated in FIG. 4B) and ISP 412 may read image frame 324 from the memory. In other cases ISP module 322 may provide image frame 324 to ISP 412 directly (e.g., via any suitable interface).

Figure 5:
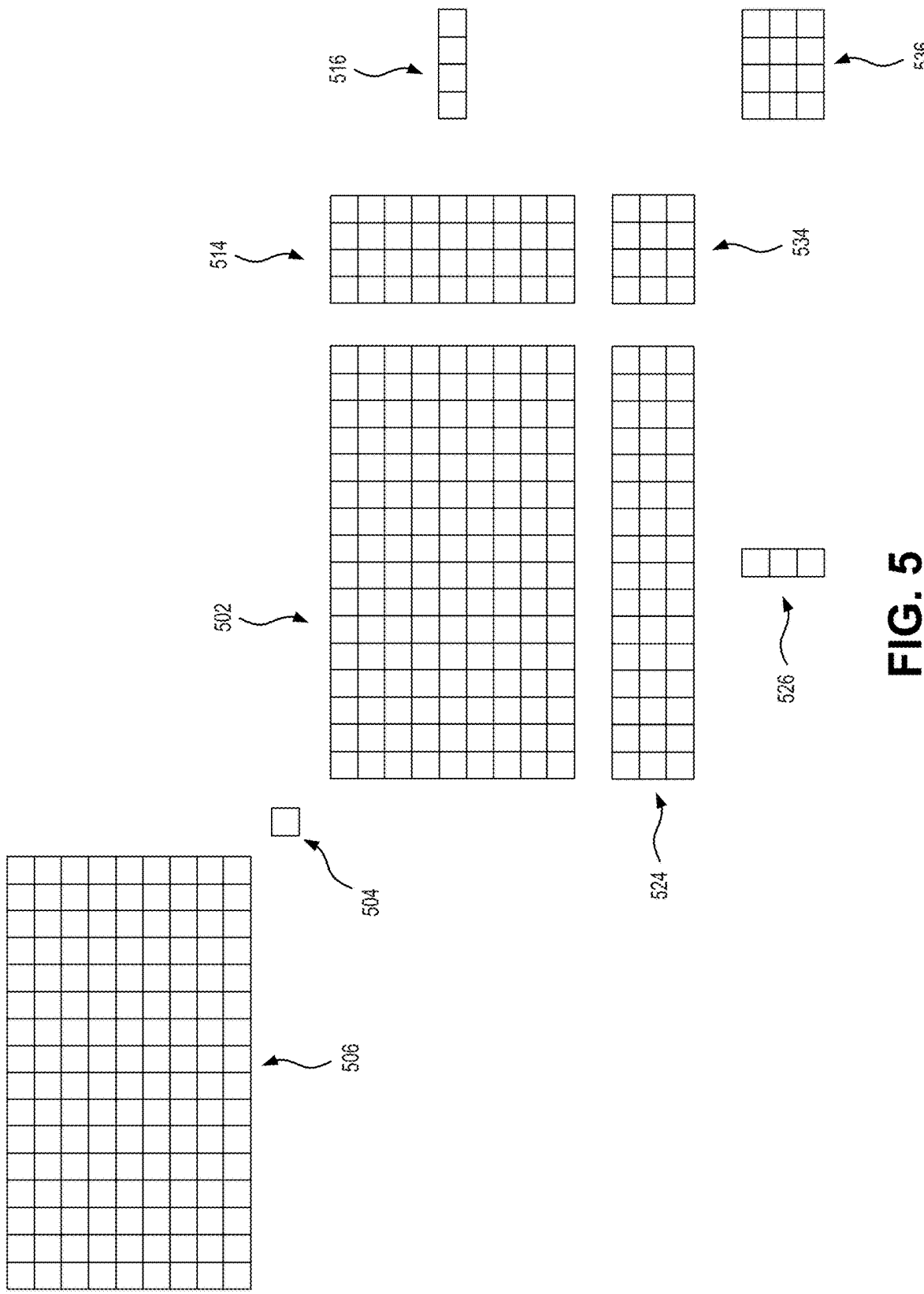
FIG. 5 is a diagram illustrating an example image frame and multiple example masks, according to various aspects of the present disclosure.

FIG. 5 is a diagram illustrating an example image frame 502 and multiple example masks, according to various aspects of the present disclosure. As an example, FIG. 5 illustrates an example image frame 502 made up of a sixteen-by-nine grid of pixels. FIG. 5 illustrates five masks that may be used to indicate pixels of image frame 502 that meet at least one luminance threshold.

As an example, mask 506 may include one value for each pixel in image frame 502. For example, each pixel of image frame 502 may correlate with a value of mask 506 according to a one-by-one mapping 504. In such a case, each value of mask 506 may indicate a corresponding valid or invalid pixel of image frame 502, where valid pixels are pixels that meet at least one luminance threshold and invalid pixels do not meet at least one luminance threshold. For example, an invalid pixel may be an over-exposed pixel or an under-exposed pixel. Mask 506 may be a binary mask (e.g., with 0 representing an invalid pixel and 1 representing a valid pixel). Alternatively, mask 506 may include multi-bit (e.g., 2-bit) values. For example, a 00 in mask 506 may indicate an invalid pixel, a 11 may indicate a valid pixel, and a 01 may indicate a partially valid pixel.

For example, rather than determining whether each pixel of image data is valid or invalid and not gating or gating the pixels, in some cases, gate 308 (of FIG. 3, FIG. 4A, and FIG. 4B) may determine partially-valid pixels and determine to compress data thereof in gated image data. As an example, gate 308 may include a full-validity threshold and a partial-validity threshold. A pixel may satisfy the partially-validity threshold but not the full validity threshold. Gate 308 may compress data representative of such a pixel rather than not such a pixel in the output image data. As an example of compression, gate 308 may retain a luminance value of a partially-valid pixel while not retaining color values. For example, in the case of RGB pixels, gate 308 may retain a green value of a partially-valid pixel as a luminance value while not retaining the red and blue values. As another example, in the case of luma, red projection, blue projection (YUV) pixels, gate 308 may retain luma values while not retaining red projection and blue projection values. Such a compression may result in a smaller image data (e.g., by compressing pixels). Smaller image data may conserve bandwidth, power, and/or processing time when the smaller data is processed, stored, and/or read.

Returning to the examples of FIG. 5, a mask 516 may include one value for a number of columns (e.g., four) of image frame 502. For example, every four columns of image frame 502 may correlate with a value of mask 516 according to a four-by-nine mapping 514. In such a case, each value of mask 516 may indicate whether the number of columns of image frame 502 collectively, are valid or invalid.

As another example, a mask 526 may include one value for a number of rows (e.g., three) of image frame 502. For example, every three columns of image frame 502 may correlate with a value of mask 526 according to a sixteen-by-three mapping 524. In such a case, each value of mask 526 may indicate whether the number of columns of image frame 502 collectively, are valid or invalid.

As yet another example, a mask 536 may include one value for an M-by-N block (e.g., a four-by-three block) of image frame 502. For example, every four-by-three block of image frame 502 may correlate with a value of mask 536 according to a four-by-three mapping 534. In such a case, each value of mask 536 may indicate whether the number of columns of image frame 502 collectively, are valid or invalid. The four-by-three block is given as an example. Any size of grouping of pixels is possible.

By mapping multiple image pixels to a single map pixel (e.g., using any of four-by-nine mapping 514, sixteen-by-three mapping 524, four-by-three mapping 534, or another mapping), gate 308 may reduce the size of mask(s) 312 and/or of image data gated by such masks. Reducing the size of mask(s) 312 and/or image data may conserve bandwidth, power and/or computing operations when writing, reading, and/or processing mask(s) 312 and/or the image data.

Figure 6:
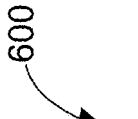
FIG. 6 is a diagram illustrating an example system for determining masks for image data, according to various aspects of the present disclosure.

FIG. 6 is a diagram illustrating an example system 600 for determining masks (e.g., a mask 612 and a mask 614) for image data (e.g., an image frame 602 and an image frame 604), according to various aspects of the present disclosure. For example, image frame 602 may be a short-exposure image and system 600 includes a gate 308 that may generate mask 612 based on which pixels of image frame 602 are more intense than a darkness threshold 608. Further, image frame 604 may be a long-exposure image and gate 308 may generate mask 614 based on which pixels of image frame 604 are less intense than a brightness threshold 610.

Image frame 602 and image frame 604 are given as examples of image data. System 600 may determine any number of masks based on any number of image frames. Image frame 602 is an example of a short-exposure image. Image frame 602 may include under-exposed pixels. Image frame 604 is an example of a long-exposure image. Image frame 604 may include over-exposed pixels.

Image frame 602 and image frame 604 may be raw image data (e.g., according to a Bayer format). For example, image frame 602 and image frame 604 may include intensity values for each pixel of a detector. The detector may have a Bayer filter that may filter light arriving at each pixel of the detector such that each pixel of the detector measures an intensity of a certain wavelength of light. For example, out of every group of adjacent four pixels, one of the pixels may measure red light, two of the pixels may measure green light, and one of the pixels may measure blue light. Bayer transformer 606 may transform image frame 602 and image frame 604 from a raw data format into a red green blue (RGB) format. In the RGB format each pixel of the image frame 602 and of image frame 604 may have three values, a value for an intensity of red, a value for an intensity of green, and a value for an intensity of blue. Following Bayer transformer 606 (or as part of Bayer transformer 606) a luma value for each pixel may be determined. The luma value of each pixel may represent the intensity of the pixel.

As described above, gate 308 may generate at least one mask indicative of which pixels of image data meet a luminance threshold. For example, gate 308 may generate mask 612. Pixels of mask 612 may indicate whether corresponding pixels of image frame 602 are brighter than darkness threshold 608. Additionally, gate 308 may generate mask 614, mask 614 may indicate whether corresponding pixels of image frame 604 are less bright than brightness threshold 610.

Brightness threshold 610 may be greater than darkness threshold 608. For example, brightness threshold 610 may be near a maximum value of the luma value of the pixels of image frame 604. For example, if the luma values of image frame 604 are stored as 8-bit values (e.g., having a range of 0 to 255), brightness threshold 610 may be close to 255 (e.g., brightness threshold 610 may be 240 or higher). Additionally, darkness threshold 608 may be near a minimum value for the luma value of the pixels of image frame 602. For example, if the luma values of image frame 602 are stored as 8-bit values, darkness threshold 608 may be close to 0 (e.g., darkness threshold 608 may be 15 or lower). By having darkness threshold 608 and brightness threshold 610 close to the extremes of the luma values, gate 308 may generate indications (in mask 612 and mask 614) that only the brightest pixels and the darkest pixels are invalid.

Figure 7:
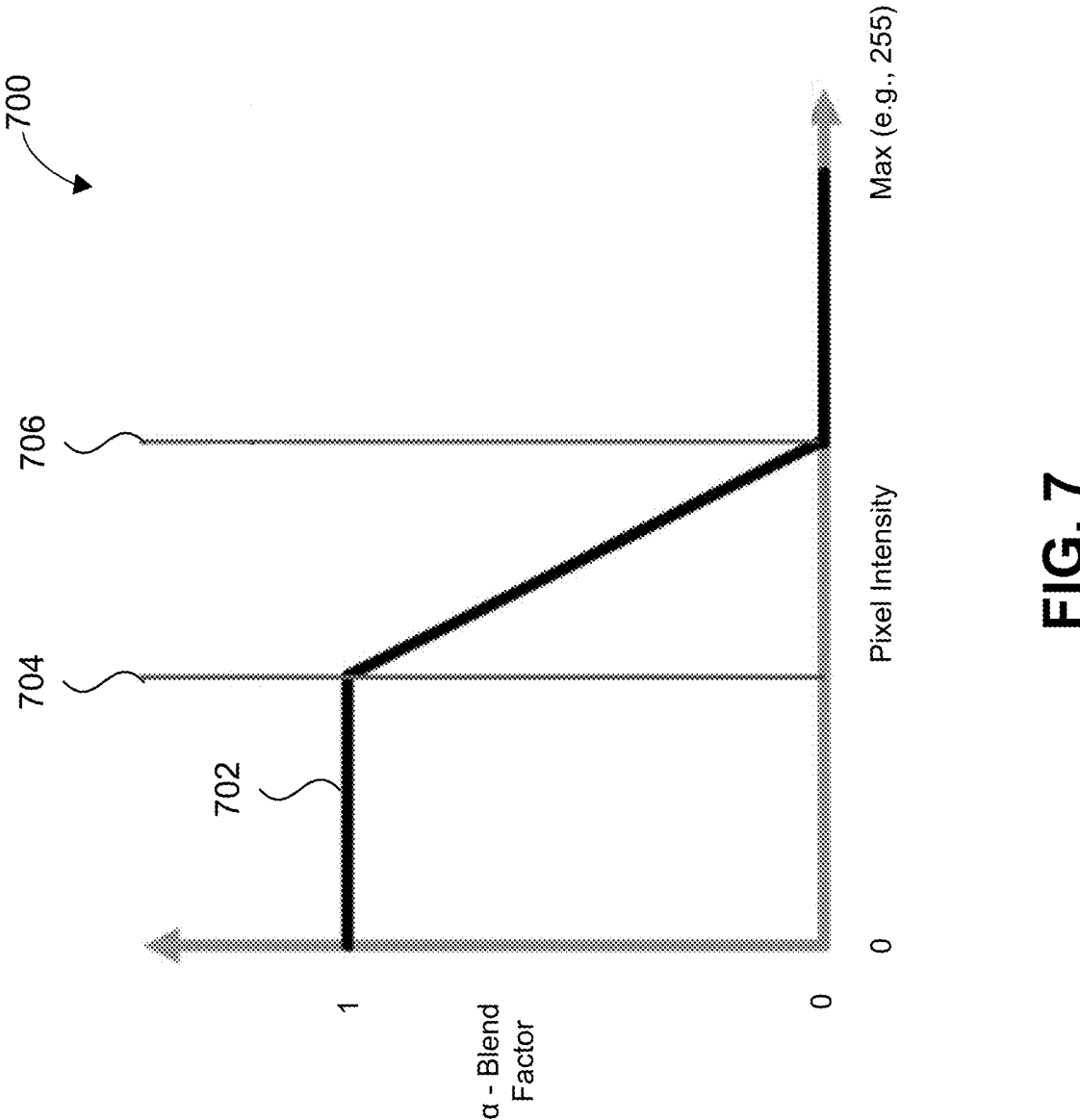
FIG. 7 includes a graph illustrating blend factor as a function of pixel intensity. The blend factor may be used to determine how to combine pixels from two images into a composite image.

FIG. 7 includes a graph 700 illustrating blend factor as a function of pixel intensity. The blend factor may be used to determine how to combine pixels from two images into a composite image. For example, a blend factor of 1 for a given pixel may indicate that the value for the pixel in the composite image should be taken from the long-exposure image and a blend factor of 0 for a given pixel may indicate that the value for the pixel in the composite image should be taken from the short-exposure image. Blend factors between 0 and 1 for a given pixel may indicate an amount of blending between the corresponding pixels of the long-exposure image and the short-exposure image. For example, a blend factor of 0.5 for a given pixel may indicate that the value for the pixel in the composite image should be a 50-50 average between the value of a corresponding pixel of the short-exposure image and the value of a corresponding pixel of the long-exposure image.

According to an example blend function 702, pixels with an intensity that is less than dark blending threshold 704 may have a blend factor of 1 and pixels with an intensity that is greater than bright blending threshold 706 may have a blend factor of 0. For example, according to blend function 702, when generating a composite image based on a short-exposure image and a long-exposure image, pixels in the short-exposure image that are less intense than dark blending threshold 704 may not be included in the composite image. Further, pixels in the long-exposure image that are more intense than bright blending threshold 706 may not be included in the composite image.

According to various aspects, the luminance thresholds of gate 308 may be set according to blending thresholds. For example, darkness threshold 608 of FIG. 6 may be set according to dark blending threshold 704 of FIG. 7 and brightness threshold 610 of FIG. 6 may be set according to bright blending threshold 706. In this way, gate 308 may determine masks (e.g., mask(s) 312, mask 612, and/or mask 614) based on how pixels will be used when generating composite images. Accordingly, gate 308 may determine to gate pixels that will not be used when generating a composite image.

A pixel in a composite image may be blended based the equation:

$$F = \alpha * L + (1 - \alpha) * ER * S$$

where F represents the intensity of the pixel in the composite image,
α represents the blend factor (which may be determined using a blend function such as blend function 702,
L represents the intensity of a given pixel in the long-exposure image,
ER represents motion,
and S represents the intensity of a corresponding pixel in the short-exposure image.

The effect of ER in the equation is to weight the short-exposure image when there is motion (e.g., to reduce blur in the composite image due to motion). Of note here, ER will weight the short-exposure image when the intensity of a given pixel in the short-exposure image is above dark blending threshold 704. Thus, gating pixels that are less intense than dark blending threshold 704 will not negatively affect generation of composite images even if there is motion in the image.

Figure 8:
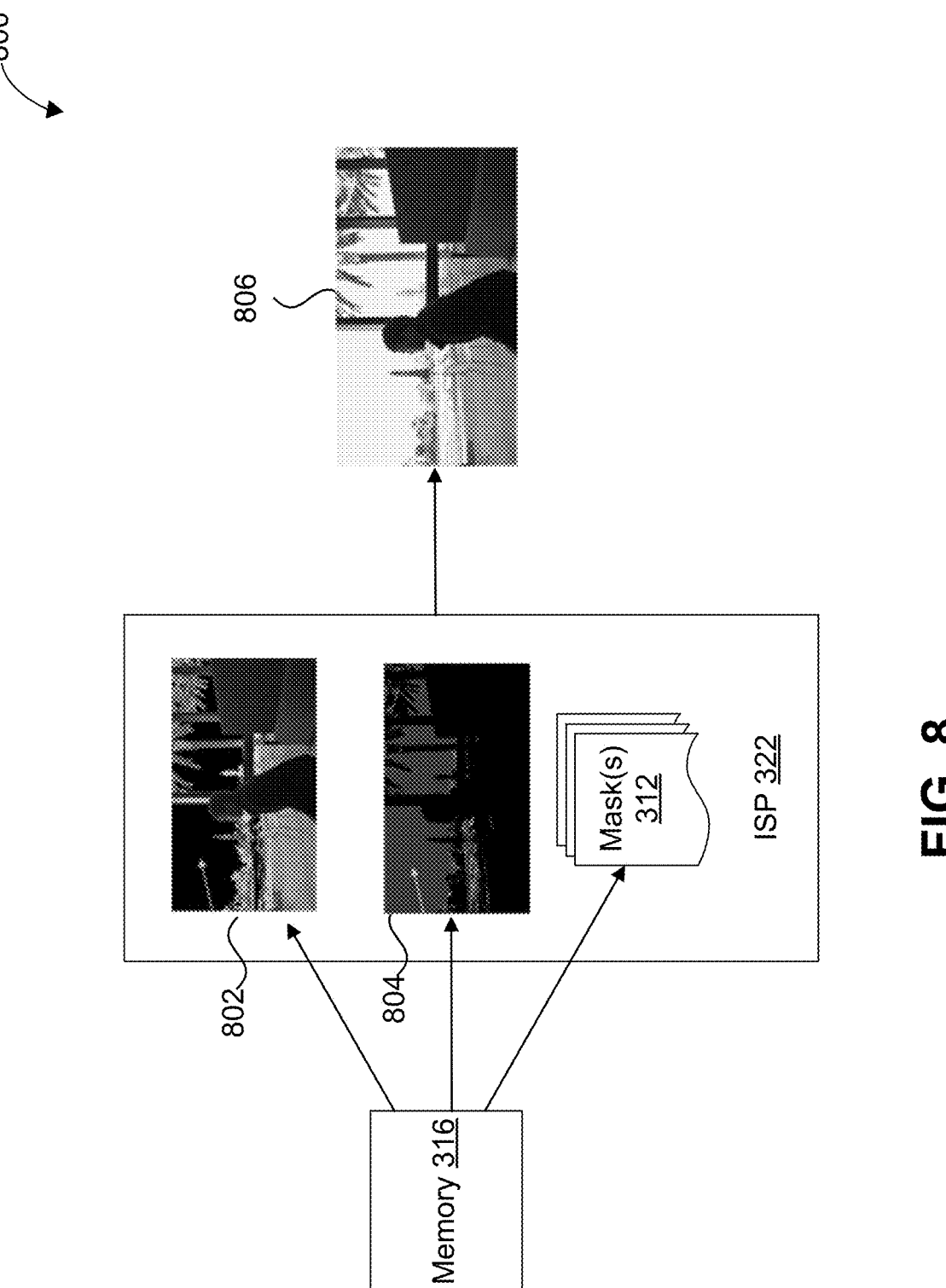
FIG. 8 is a diagram illustrating an example system for reading image data from memory, according to various aspects of the present disclosure.

FIG. 8 is a diagram illustrating an example system 800 for reading image data from memory 316, according to various aspects of the present disclosure. For example, system 800 includes an ISP module 322 that may read image data from memory 316. In some cases, ISP module 322 may further generate an image frame 806 (e.g., a composite image) based on the image data.

As described above, image data may be stored in memory 316. Also as described above, ISP module 322 may read the image data from memory 316 according to mask(s) 312. There are at least four ways in which the image data can be written to and read from memory 316.

According to a first example, all pixels of the image data may be written to memory 316 and some of the pixels may not be read from memory 316. For example, all of the pixels of both the short-exposure image and the long-exposure image may be written to memory 316. ISP module 322 may read the image data from memory 316 based on mask(s) 312. When the image data is read from memory 316, pixels of a short-exposure image with an intensity that does not exceed a darkness threshold may not be read from memory 316 (based on ISP module 322 reading from memory 316 according to mask(s) 312). Additionally, when the image data is read from memory 316, pixels of a long-exposure image with an intensity that exceeds a brightness threshold may not be read from memory 316 (based on ISP module 322 reading from memory 316 according to mask(s) 312). Systems and techniques implementing the first example gain the benefits of conserving bandwidth, power, and processing time by reading less data (e.g., less than the entirety of the image data) from memory 316.

According to a second example, gated pixels may not be written to memory 316. For example, pixels of a short-exposure image with an intensity that does not exceed a darkness threshold may not be written to memory 316 (e.g., based on mask(s) 312) and pixels of a long-exposure image with an intensity that exceeds a brightness threshold may not be written to memory 316 (e.g., based on mask(s) 312). Systems and techniques implementing the second example gain the benefits of conserving bandwidth, power, and processing time by writing less data (e.g., less than the entirety of the image data) to memory 316. Further, systems and techniques implementing the second example also gain the benefits of conserving bandwidth, power, and processing time by reading less data (e.g., less than the entirety of the image data) from memory 316.

According to a third example, data representing at least some pixels of the image data may be compressed before being written to memory 316. For example, gate 308 may obtain image data according to a luma, red projection, blue projection (YUV) or red green blue (RGB) format. For pixels that do not meet the luminance threshold, compressed (or partial) data may be stored (e.g., either with the image data or in a mask). For example, for pixels that do not meet the luminance threshold, luma or green values may be stored and red project and blue projection or red and blue values may be discarded.

As an example, image frame 802 is an example of image data with pixels that exceed a brightness threshold removed. The removed pixels are illustrated as black in FIG. 8. In some cases, when ISP module 322 reads image frame 802 from memory 316, ISP module 322 may store zeros in place of pixels not read from memory 316. Further, image frame 804 is an example of luma values of the pixels removed from image frame 802.

In some cases, image frame 802 and image frame 804 may be stored together in memory as an images. In such cases mask(s) 312 may indicate which pixels of the image have been compressed (or stored only as luma values). In other cases, image frame 802 may be stored and image frame 804 may be stored as a separate image data or as a mask. As a mask, image frame 804 may indicate pixels that did not exceed the brightness threshold (e.g., pixels that are black in image frame 804). Further, image frame 804 may include luma values. In either case, the luma values may be used when generating a composite image (e.g., image frame 806).

Further, the luma values (e.g., of image frame 804) may be compressed. For example, one or more of the most significant bits (MSBs) of the luma values may be discarded. For instance, when storing luma values of pixels that did not meet a luminance threshold (e.g., under-exposed pixels or over-exposed pixels), the MSBs representing such pixels may be the same in all cases. Because they are the same, they can be not stored, and assumed when read. For example, a brightness threshold may specify that all pixels having a luma value above 240 (in an 8-bit scale) exceed the brightness threshold. In such cases, all pixels exceeding the brightness threshold will have the same four MSBs. Decimal 240 is 11110000 in binary and decimal 255 is 11111111 in binary. All numbers between decimal 240 and decimal 255 will have 1111 as their MSBs in binary. Accordingly, when storing the luma values, the MSBs may be discarded and when reading the luma values, the MSBs may be assumed. Similarly, a darkness threshold may specify that all pixels having a luma value below 15 (in an 8-bit scale) not exceed the darkness threshold. In such cases, all pixels exceeding the darkness threshold will have the same four MSBs (e.g., 0000). Accordingly, when storing the luma values, the MSBs may be discarded and when reading the luma values, the MSBs may be assumed. Systems and techniques implementing the third example gain the benefits of conserving bandwidth, power, and processing time by writing and reading less data (e.g., compressed image data).

According to a fourth example, some pixels may be gated and not written to memory 316 (e.g., as described with regard to the second example), some pixels may be compressed and written to memory (e.g., as described with regard to the third example), and some pixels (e.g., pixels meeting the luminance threshold) may be written to memory 316. For example, gate 308 may include a full-validity threshold (e.g., a darkness threshold and a brightness threshold) beyond which pixels are not written to memory 316 (e.g., as described with regard to the second example). Further, gate 308 may include a partial-validity threshold (e.g., a darkness threshold and a brightness threshold) beyond which data representing pixels is compressed or partially written to memory 316 (e.g., as described with regard to the third example). Systems and techniques implementing the fourth example gain the benefits of conserving bandwidth, power, and processing time by writing and reading less data (e.g., a portion of the image data and compressed image data).

FIG. 9A is a flow diagram illustrating a process 900A for processing data, in accordance with aspects of the present disclosure. One or more operations of process 900A may be performed by a computing device (or apparatus) or a component (e.g., a chipset, codec, etc.) of the computing device.

The computing device may be a mobile device (e.g., a mobile phone), a network-connected wearable such as a watch, an extended reality (XR) device such as a virtual reality (VR) device or augmented reality (AR) device, a vehicle or component or system of a vehicle, a desktop computing device, a tablet computing device, a server computer, a robotic device, and/or any other computing device with the resource capabilities to perform the process 900A. The one or more operations of process 900A may be implemented as software components that are executed and run on one or more processors.

At block 902, a computing device (or one or more components thereof) may receive image data. For example, system 300 of FIG. 3 may receive image frame 304 and image frame 306 (e.g., from image sensor 302). As another example, system 400 of FIG. 4B may receive image frame 304 and image frame 306. As another example, system 600 of FIG. 6 may receive image frame 602 and image frame 604. In some aspects, the image data may be raw image data. For example, system 300 or system 400 may receive image frame 304 and image frame 306 from image sensor 302.

In some aspects, the image data may include first image data and second image data. The at least one mask may be indicative of pixels of the first image data with an intensity that is greater than a darkness threshold and indicative of pixels of the second image data with an intensity that is less than a brightness threshold. For example, the image data received at block 902 may include image frame 304 and image frame 306 and mask(s) 312 may be indicative of pixels of image frame 304 with an intensity that is greater than a darkness threshold and indicative of pixels of image frame 306 with an intensity that is less than a brightness threshold.

In some aspects, the first image data may be associated with a first exposure, and the second image data may be associated with a second exposure that is greater than the first exposure. For example, image frame 304 may be a short-exposure image and image frame 306 may be a long-exposure image. For instance, the first image data may be image frame 602 of FIG. 6 and the second image data may be image frame 604 of FIG. 6.

At block 904, the computing device (or one or more components thereof) may determine at least one mask based on intensities of pixels of the image data. The at least one mask may be indicative of pixels of the image data with intensities that meet at least one luminance threshold. For example, gate 308 of FIG. 3 or FIG. 4B may determine mask(s) 312. As another example, gate 308 of FIG. 6 may determine mask 612 and/or mask 614.

In some aspects, the at least one mask may include a first mask indicative of pixels of the first image data with an intensity that is greater than a darkness threshold and a second mask indicative of pixels of the second image data with an intensity that is less than a brightness threshold. For example, the mask may include mask 612 of FIG. 6 and mask 614 of FIG. 6.

In some aspects, the at least one mask may include a mask indicative of pixels of the first image data with an intensity that is greater than a darkness threshold and indicative of pixels of the second image data with an intensity that is less than a brightness threshold. For example, the mask may include all the data represented by both mask 612 and mask 614.

In some aspects, the at least one mask may indicative of groups of pixels of the first image data with an intensity that is greater than a darkness threshold and groups of pixels of the second image data with an intensity that is less than a brightness threshold. For example, the mask may indicate groups of pixels (e.g., as described with regard to FIG. 5).

In some aspects, the image data may include third image data and the at least one mask may be indicative of pixels of the third image data with an intensity that is greater than the darkness threshold and less than the brightness threshold. For example, the image data may include a medium-exposure image (e.g., medium-exposure image 206 of FIG. 2).

In some aspects, process 900A may include one or more of block 906, block 908, and/or block 910, block 912, block 914, and block 916. For example, in some aspects, process 900A may include block 906 and none of the others of block 908, block 910, block 912, block 914, and block 916. In other aspects, process 900A may include block 908 and none of the others of block 906, block 910, block 912, block 914, and block 916. In other aspects, process 900A may include block 906 and block 908 and none of the others of block 910, block 912, block 914, and block 916. In other aspects, process 900A may include block 910, block 912, block 914, and block 916 and neither block 906 nor block 908. In other aspects, process 900A may include block 906, block 910, block 912, block 914, and block 916 and not block 908. In other aspects, process 900A may include block 908, block 910, block 912, block 914, and block 916 and not block 906. In other aspects, process 900A may include all of block 906, block 908, block 910, block 912, block 914, and block 916.

At block 906, the computing device (or one or more components thereof) may process a portion of the image data based on the at least one mask. For example, ISP module 313 of FIG. 3 or FIG. 4B may process image frame 305 and/or image frame 307 based on mask(s) 312.

In some aspects, processing the portion of the image data based on the at least one mask may include processing the pixels of the first image data with respective intensities that are greater than a darkness threshold as indicated by the at least one mask and processing the pixels of the second image data with respective intensities that are less than a brightness threshold as indicated by the at least one mask. For example, the processing of block 906 may include processing (e.g., at ISP module 313) pixels of image frame 304 with respective intensities that are greater than a darkness threshold (e.g., image frame 305) as indicated by mask(s) 312 and processing the pixels of image frame 306 with respective intensities that are less than a brightness threshold (e.g., image frame 307) as indicated by the mask(s) 312. In some aspects, processing the portion of the image data based on the at least one mask may include processing less than an entirety of the image data based on the at least one mask.

In some aspects, processing the portion of the image data based on the at least one mask may include processing the portion of the image data as it is received. For example, the processing of block 906 may occur as the image data is received. In some cases, the processing of block 906 may be performed by a frontend engine (e.g., frontend 402 of FIG. 4A).

At block 908, the computing device (or one or more components thereof) may store the portion of the image data in a memory based on the at least one mask. For example, system 300 of FIG. 3 or system 400 of FIG. 4B may store image frame 310 and/or image frame 314 at memory 316. As another example, frontend 402 of FIG. 4A may store image data at memory 316.

In some aspects, storing the portion of the image data in the memory based on the at least one mask may include storing the pixels of the first image data with respective intensities that are greater than a darkness threshold, as indicated by the at least one mask, in the memory and storing the pixels of the second image data with respective intensities that are less than a brightness threshold, as indicated by the at least one mask, in the memory. For example, the storing of block 908 may include storing the pixels of image frame 304 with respective intensities that are greater than a darkness threshold (e.g., image frame 310), as indicated by mask(s) 312, in memory 316 and storing the pixels of image frame 306 with respective intensities that are less than a brightness threshold (e.g., image frame 314), as indicated by mask(s) 312, in memory 316. In some aspects, storing the portion of the image data in the memory based on the at least one mask may include storing less than an entirety of the image data in the memory based on the at least one mask.

At block 910, the computing device (or one or more components thereof) may store the at least one mask in the memory. For example, system 300 of FIG. 3 or system 400 of FIG. 4B may store mask(s) 312 in memory 316. As another example, frontend 402 of FIG. 4A may store at least one mask in memory 316.

At block 912, the computing device (or one or more components thereof) may read the at least one mask from the memory. For example, system 300 of FIG. 3 or system 400 of FIG. 4B may read mask(s) 312 from memory 316. As another example, frontend 402 of FIG. 4A may read at least one mask from memory 316.

In some aspects, reading the portion of the image data from the memory based on the at least one mask may include reading the pixels of the first image data with respective intensities that are greater than a darkness threshold, as indicated by the at least one mask, from the memory and reading the pixels of the second image data with respective intensities that are less than a brightness threshold, as indicated by the at least one mask, from the memory. For example, the reading of block 912 may include reading the pixels of image frame 304 with respective intensities that are greater than a darkness threshold (e.g., image frame 318), as indicated by mask(s) 312, from memory 316 and reading the pixels of image frame 306 with respective intensities that are less than a brightness threshold (e.g., image frame 320), as indicated by mask(s) 312, from memory 316.

In some aspects, process 900A may include (e.g., at block 908) storing an entirety of the image data in the memory. Reading the portion of the image data from the memory based on the at least one mask (e.g., at block 910) may include reading less than the entirety of the image data from the memory based on the at least one mask. In some aspects, process 900A may include (e.g., at block 908) storing a portion of the image data in the memory.

At block 914, the computing device (or one or more components thereof) may read the portion of the image data from the memory based on the at least one mask. For example, system 300 of FIG. 3 or system 400 of FIG. 4B may read image frame 318 and/or image frame 320 from memory 316. As another example, frontend 402 of FIG. 4A may read image data from memory 316.

At block 916, the computing device (or one or more components thereof) may process the portion of the image data read from the memory. For example, ISP module 322 of FIG. 3 or FIG. 4B may process image frame 318 and/or image frame 320.

In some aspects, the computing device (or one or more components thereof) may combine the first image data read from the memory and the second image data read from the memory to generate composite image data. For example, in some aspects, block 916 may include generating a composite image (e.g., as described with regard to FIG. 2) using image data read from the memory (e.g., at block 914).

In some aspects, process 900A may include prior to storing the portion of the image data in the memory, compressing the portion of the image data based on the at least one mask and after reading the portion of stored image data from the memory, decompressing the portion of the image data based on the at least one mask. For example, system 300 of FIG. 3 or system 400 of FIG. 4B may compress image frame 310 and/or image frame 314 prior to storing image frame 310 and/or image frame 314 in memory 316 and system 300 may decompress image frame 318 and/or image frame 320. In some aspects, storing the portion of the image data may include storing respective color values and a respective luma value for each pixel of the portion of the image data and storing a respective luma value for each pixel of a remainder of the image data. In some aspects, storing the respective luma value for each pixel of the remainder of the image data may include storing least-significant bits of the respective luma value.

Figure 9B:
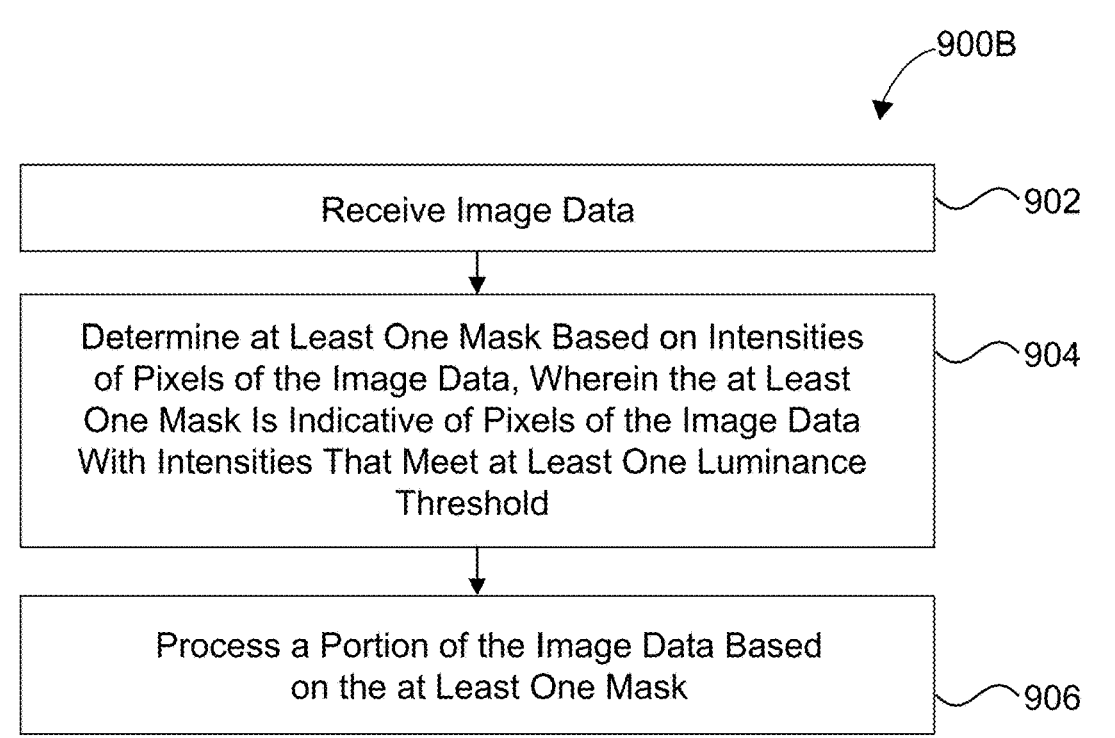

FIG. 9B is a flow diagram illustrating a process 900B for processing data, in accordance with aspects of the present disclosure. One or more operations of process 900B may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, a desktop computing device, a tablet computing device, a server computer, a robotic device, and/or any other computing device with the resource capabilities to perform the process 900B. The one or more operations of process 900B may be implemented as software components that are executed and run on one or more processors.

At block 902, a computing device (or one or more components thereof) may receive image data. For example, system 300 of FIG. 3 may receive image frame 304 and image frame 306 (e.g., from image sensor 302). As another example, system 400 of FIG. 4B may receive image frame 304 and image frame 306. As another example, system 600 of FIG. 6 may receive image frame 602 and image frame 604. In some aspects, the image data may be raw image data. For example, system 300 or system 400 may receive image frame 304 and image frame 306 from image sensor 302.

In some aspects, the image data may include first image data and second image data. The at least one mask may be indicative of pixels of the first image data with an intensity that is greater than a darkness threshold and indicative of pixels of the second image data with an intensity that is less than a brightness threshold. For example, the image data received at block 902 may include image frame 304 and image frame 306 and mask(s) 312 may be indicative of pixels of image frame 304 with an intensity that is greater than a darkness threshold and indicative of pixels of image frame 306 with an intensity that is less than a brightness threshold.

In some aspects, the first image data may be associated with a first exposure, and the second image data may be associated with a second exposure that is greater than the first exposure. For example, image frame 304 may be a short-exposure image and image frame 306 may be a long-exposure image. For instance, the first image data may be image frame 602 of FIG. 6 and the second image data may be image frame 604 of FIG. 6.

At block 904, the computing device (or one or more components thereof) may determine at least one mask based on intensities of pixels of the image data. The at least one mask may be indicative of pixels of the image data with intensities that meet at least one luminance threshold. For example, gate 308 of FIG. 3 or FIG. 4B may determine mask(s) 312. As another example, gate 308 of FIG. 6 may determine mask 612 and/or mask 614.

In some aspects, the at least one mask may include a first mask indicative of pixels of the first image data with an intensity that is greater than a darkness threshold and a second mask indicative of pixels of the second image data with an intensity that is less than a brightness threshold. For example, the mask may include mask 612 of FIG. 6 and mask 614 of FIG. 6.

In some aspects, the at least one mask may include a mask indicative of pixels of the first image data with an intensity that is greater than a darkness threshold and indicative of pixels of the second image data with an intensity that is less than a brightness threshold. For example, the mask may include all the data represented by both mask 612 and mask 614.

In some aspects, the at least one mask may indicative of groups of pixels of the first image data with an intensity that is greater than a darkness threshold and groups of pixels of the second image data with an intensity that is less than a brightness threshold. For example, the mask may indicate groups of pixels (e.g., as described with regard to FIG. 5).

In some aspects, the image data may include third image data and the at least one mask may be indicative of pixels of the third image data with an intensity that is greater than the darkness threshold and less than the brightness threshold. For example, the image data may include a medium-exposure image (e.g., medium-exposure image 206 of FIG. 2).

At block 906, the computing device (or one or more components thereof) may process a portion of the image data based on the at least one mask. For example, ISP module 313 of FIG. 3 or FIG. 4B may process image frame 305 and/or image frame 307 based on mask(s) 312.

In some aspects, processing the portion of the image data based on the at least one mask may include processing the pixels of the first image data with respective intensities that are greater than a darkness threshold as indicated by the at least one mask and processing the pixels of the second image data with respective intensities that are less than a brightness threshold as indicated by the at least one mask. For example, the processing of block 906 may include processing (e.g., at ISP module 313) pixels of image frame 304 with respective intensities that are greater than a darkness threshold (e.g., image frame 305) as indicated by mask(s) 312 and processing the pixels of image frame 306 with respective intensities that are less than a brightness threshold (e.g., image frame 307) as indicated by the mask(s) 312. In some aspects, processing the portion of the image data based on the at least one mask may include processing less than an entirety of the image data based on the at least one mask.

In some aspects, processing the portion of the image data based on the at least one mask may include processing the portion of the image data as it is received. For example, the processing of block 906 may occur as the image data is received. In some cases, the processing of block 906 may be performed by a frontend engine (e.g., frontend 402 of FIG. 4A).

Figure 9C:
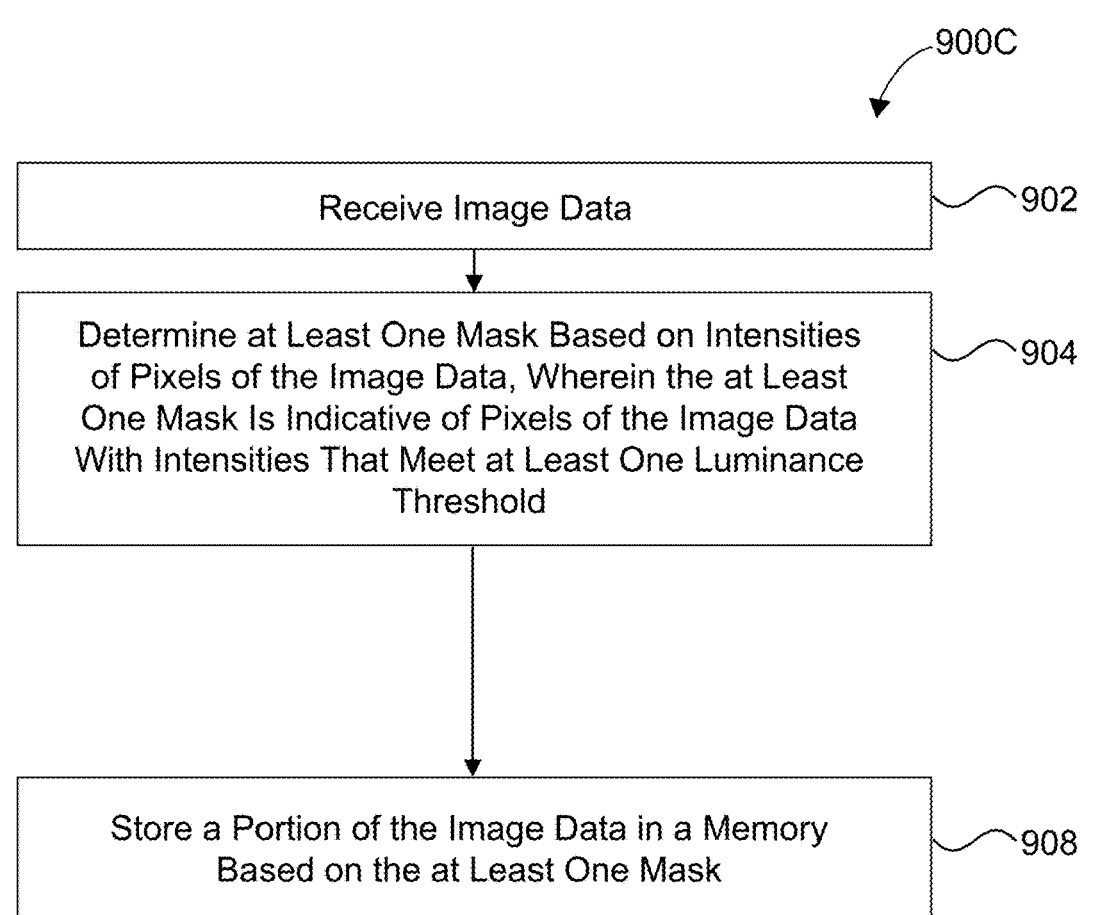

FIG. 9C is a flow diagram illustrating a process 900C for processing data, in accordance with aspects of the present disclosure. One or more operations of process 900C may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, a desktop computing device, a tablet computing device, a server computer, a robotic device, and/or any other computing device with the resource capabilities to perform the process 900C. The one or more operations of process 900C may be implemented as software components that are executed and run on one or more processors.

At block 902, a computing device (or one or more components thereof) may receive image data. For example, system 300 of FIG. 3 may receive image frame 304 and image frame 306 (e.g., from image sensor 302). As another example, system 400 of FIG. 4B may receive image frame 304 and image frame 306. As another example, system 600 of FIG. 6 may receive image frame 602 and image frame 604. In some aspects, the image data may be raw image data. For example, system 300 or system 400 may receive image frame 304 and image frame 306 from image sensor 302.

In some aspects, the image data may include first image data and second image data. The at least one mask may be indicative of pixels of the first image data with an intensity that is greater than a darkness threshold and indicative of pixels of the second image data with an intensity that is less than a brightness threshold. For example, the image data received at block 902 may include image frame 304 and image frame 306 and mask(s) 312 may be indicative of pixels of image frame 304 with an intensity that is greater than a darkness threshold and indicative of pixels of image frame 306 with an intensity that is less than a brightness threshold.

In some aspects, the first image data may be associated with a first exposure, and the second image data may be associated with a second exposure that is greater than the first exposure. For example, image frame 304 may be a short-exposure image and image frame 306 may be a long-exposure image. For instance, the first image data may be image frame 602 of FIG. 6 and the second image data may be image frame 604 of FIG. 6.

At block 904, the computing device (or one or more components thereof) may determine at least one mask based on intensities of pixels of the image data. The at least one mask may be indicative of pixels of the image data with intensities that meet at least one luminance threshold. For example, gate 308 of FIG. 3 or FIG. 4B may determine mask(s) 312. As another example, gate 308 of FIG. 6 may determine mask 612 and/or mask 614.

In some aspects, the at least one mask may include a first mask indicative of pixels of the first image data with an intensity that is greater than a darkness threshold and a second mask indicative of pixels of the second image data with an intensity that is less than a brightness threshold. For example, the mask may include mask 612 of FIG. 6 and mask 614 of FIG. 6.

In some aspects, the at least one mask may include a mask indicative of pixels of the first image data with an intensity that is greater than a darkness threshold and indicative of pixels of the second image data with an intensity that is less than a brightness threshold. For example, the mask may include all the data represented by both mask 612 and mask 614.

In some aspects, the at least one mask may indicative of groups of pixels of the first image data with an intensity that is greater than a darkness threshold and groups of pixels of the second image data with an intensity that is less than a brightness threshold. For example, the mask may indicate groups of pixels (e.g., as described with regard to FIG. 5).

In some aspects, the image data may include third image data and the at least one mask may be indicative of pixels of the third image data with an intensity that is greater than the darkness threshold and less than the brightness threshold. For example, the image data may include a medium-exposure image (e.g., medium-exposure image 206 of FIG. 2).

At block 908, the computing device (or one or more components thereof) may store a portion of the image data in a memory based on the at least one mask. For example, system 300 of FIG. 3 or system 400 of FIG. 4B may store image frame 310 and/or image frame 314 at memory 316. As another example, frontend 402 of FIG. 4A may store image data at memory 316.

In some aspects, storing the portion of the image data in the memory based on the at least one mask may include storing the pixels of the first image data with respective intensities that are greater than a darkness threshold, as indicated by the at least one mask, in the memory and storing the pixels of the second image data with respective intensities that are less than a brightness threshold, as indicated by the at least one mask, in the memory. For example, the storing of block 908 may include storing the pixels of image frame 304 with respective intensities that are greater than a darkness threshold (e.g., image frame 310), as indicated by mask(s) 312, in memory 316 and storing the pixels of image frame 306 with respective intensities that are less than a brightness threshold (e.g., image frame 314), as indicated by mask(s) 312, in memory 316. In some aspects, storing the portion of the image data in the memory based on the at least one mask may include storing less than an entirety of the image data in the memory based on the at least one mask.

FIG. 9D is a flow diagram illustrating a process 900D for processing data, in accordance with aspects of the present disclosure. One or more operations of process 900D may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, a desktop computing device, a tablet computing device, a server computer, a robotic device, and/or any other computing device with the resource capabilities to perform the process 900D. The one or more operations of process 900D may be implemented as software components that are executed and run on one or more processors.

At block 902, a computing device (or one or more components thereof) may receive image data. For example, system 300 of FIG. 3 may receive image frame 304 and image frame 306 (e.g., from image sensor 302). As another example, system 400 of FIG. 4B may receive image frame 304 and image frame 306. As another example, system 600 of FIG. 6 may receive image frame 602 and image frame 604. In some aspects, the image data may be raw image data. For example, system 300 or system 400 may receive image frame 304 and image frame 306 from image sensor 302.

In some aspects, the image data may include first image data and second image data. The at least one mask may be indicative of pixels of the first image data with an intensity that is greater than a darkness threshold and indicative of pixels of the second image data with an intensity that is less than a brightness threshold. For example, the image data received at block 902 may include image frame 304 and image frame 306 and mask(s) 312 may be indicative of pixels of image frame 304 with an intensity that is greater than a darkness threshold and indicative of pixels of image frame 306 with an intensity that is less than a brightness threshold.

In some aspects, the first image data may be associated with a first exposure, and the second image data may be associated with a second exposure that is greater than the first exposure. For example, image frame 304 may be a short-exposure image and image frame 306 may be a long-exposure image. For instance, the first image data may be image frame 602 of FIG. 6 and the second image data may be image frame 604 of FIG. 6.

At block 904, the computing device (or one or more components thereof) may determine at least one mask based on intensities of pixels of the image data. The at least one mask may be indicative of pixels of the image data with intensities that meet at least one luminance threshold. For example, gate 308 of FIG. 3 or FIG. 4B may determine mask(s) 312. As another example, gate 308 of FIG. 6 may determine mask 612 and/or mask 614.

In some aspects, the at least one mask may include a first mask indicative of pixels of the first image data with an intensity that is greater than a darkness threshold and a second mask indicative of pixels of the second image data with an intensity that is less than a brightness threshold. For example, the mask may include mask 612 of FIG. 6 and mask 614 of FIG. 6.

In some aspects, the at least one mask may include a mask indicative of pixels of the first image data with an intensity that is greater than a darkness threshold and indicative of pixels of the second image data with an intensity that is less than a brightness threshold. For example, the mask may include all the data represented by both mask 612 and mask 614.

In some aspects, the at least one mask may indicative of groups of pixels of the first image data with an intensity that is greater than a darkness threshold and groups of pixels of the second image data with an intensity that is less than a brightness threshold. For example, the mask may indicate groups of pixels (e.g., as described with regard to FIG. 5).

In some aspects, the image data may include third image data and the at least one mask may be indicative of pixels of the third image data with an intensity that is greater than the darkness threshold and less than the brightness threshold. For example, the image data may include a medium-exposure image (e.g., medium-exposure image 206 of FIG. 2).

At block 909, the computing device (or one or more components thereof) may store the image data in a memory. For example, system 300 of FIG. 3 or system 400 of FIG. 4B may store image frame 310 and/or image frame 314 at memory 316. As another example, frontend 402 of FIG. 4A may store image data at memory 316.

In some aspects, storing the image data in the memory may include storing the pixels of the first image data with respective intensities that are greater than a darkness threshold, as indicated by the at least one mask, in the memory and storing the pixels of the second image data with respective intensities that are less than a brightness threshold, as indicated by the at least one mask, in the memory. For example, the storing of block 909 may include storing the pixels of image frame 304 with respective intensities that are greater than a darkness threshold (e.g., image frame 310), as indicated by mask(s) 312, in memory 316 and storing the pixels of image frame 306 with respective intensities that are less than a brightness threshold (e.g., image frame 314), as indicated by mask(s) 312, in memory 316. In some aspects, storing the image data in the memory may include storing less than an entirety of the image data in the memory based on the at least one mask. In other aspects, storing the image data in the memory may include storing the entirety of the image data in the memory.

At block 910, the computing device (or one or more components thereof) may store the at least one mask in the memory. For example, system 300 of FIG. 3 or system 400 of FIG. 4B may store mask(s) 312 in memory 316. As another example, frontend 402 of FIG. 4A may store at least one mask in memory 316.

At block 912, the computing device (or one or more components thereof) may read the at least one mask from the memory. For example, system 300 of FIG. 3 or system 400 of FIG. 4B may read mask(s) 312 from memory 316. As another example, frontend 402 of FIG. 4A may read at least one mask from memory 316.

In some aspects, reading the portion of the image data from the memory based on the at least one mask may include reading the pixels of the first image data with respective intensities that are greater than a darkness threshold, as indicated by the at least one mask, from the memory and reading the pixels of the second image data with respective intensities that are less than a brightness threshold, as indicated by the at least one mask, from the memory. For example, the reading of block 912 may include reading the pixels of image frame 304 with respective intensities that are greater than a darkness threshold (e.g., image frame 318), as indicated by mask(s) 312, from memory 316 and reading the pixels of image frame 306 with respective intensities that are less than a brightness threshold (e.g., image frame 320), as indicated by mask(s) 312, from memory 316.

In some aspects, process 900D may include (e.g., at block 908) storing an entirety of the image data in the memory. Reading the portion of the image data from the memory based on the at least one mask (e.g., at block 910) may include reading less than the entirety of the image data from the memory based on the at least one mask. In some aspects, process 900D may include (e.g., at block 908) storing a portion of the image data in the memory.

At block 914, the computing device (or one or more components thereof) may read the portion of the image data from the memory based on the at least one mask. For example, system 300 of FIG. 3 or system 400 of FIG. 4B may read image frame 318 and/or image frame 320 from memory 316. As another example, frontend 402 of FIG. 4A may read image data from memory 316.

At block 916, the computing device (or one or more components thereof) may process the portion of the image data read from the memory. For example, ISP module 322 of FIG. 3 or FIG. 4B may process image frame 318 and/or image frame 320.

In some aspects, the computing device (or one or more components thereof) may combine the first image data read from the memory and the second image data read from the memory to generate composite image data. For example, in some aspects, block 916 may include generating a composite image (e.g., as described with regard to FIG. 2) using image data read from the memory (e.g., at block 914).

In some aspects, process 900D may include prior to storing the portion of the image data in the memory, compressing the portion of the image data based on the at least one mask and after reading the portion of stored image data from the memory, decompressing the portion of the image data based on the at least one mask. For example, system 300 of FIG. 3 or system 400 of FIG. 4B may compress image frame 310 and/or image frame 314 prior to storing image frame 310 and/or image frame 314 in memory 316 and system 300 may decompress image frame 318 and/or image frame 320. In some aspects, storing the portion of the image data may include storing respective color values and a respective luma value for each pixel of the portion of the image data and storing a respective luma value for each pixel of a remainder of the image data. In some aspects, storing the respective luma value for each pixel of the remainder of the image data may include storing least-significant bits of the respective luma value.

In some examples, as noted previously, the methods described herein (e.g., process 900A of FIG. 9A, process 900B of FIG. 9B, process 900C of FIG. 9C, process 900D of FIG. 9D and/or other methods described herein) can be performed, in whole or in part, by a computing device or apparatus. In one example, one or more of the methods can be performed by image-processing system 100 of FIG. 1, system 300 of FIG. 3, system 400 of FIG. 4A and FIG. 4B, system 600 of FIG. 6, system 800 of FIG. 8, or by another system or device. In another example, one or more of the methods (e.g., process 900A, process 900B, process 900C, process 900D, and/or other methods described herein) can be performed, in whole or in part, by the computing-device architecture 1000 shown in FIG. 10. For instance, a computing device with the computing-device architecture 1000 shown in FIG. 10 can include, or be included in, the components of the image-processing system 100 of FIG. 1, system 300 of FIG. 3, system 400 of FIG. 4A and FIG. 4B, system 600 of FIG. 6, system 800 of FIG. 8 and can implement the operations of process 900A, process 900B, process 900C, process 900D, and/or other process described herein. In some cases, the computing device or apparatus can include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device can include a display, a network interface configured to communicate and/or receive the data, any combination thereof, and/or other component(s). The network interface can be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

Process 900A, process 900B, process 900C, process 900D, and/or other process described herein are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, process 900A, process 900B, process 900C, process 900D, and/or other process described herein can be performed under the control of one or more computer systems configured with executable instructions and can be implemented as code (e.g., executable instructions, one or more computer programs, or one or more applications) executing collectively on one or more processors, by hardware, or combinations thereof. As noted above, the code can be stored on a computer-readable or machine-readable storage medium, for example, in the form of a computer program comprising a plurality of instructions executable by one or more processors. The computer-readable or machine-readable storage medium can be non-transitory.

FIG. 10 illustrates an example computing-device architecture 1000 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. For example, the computing-device architecture 1000 may include, implement, or be included in any or all of image-processing system 100 of FIG. 1, system 300 of FIG. 3, system 400 of FIG. 4A and FIG. 4B, system 600 of FIG. 6, system 800 of FIG. 8.

The components of computing-device architecture 1000 are shown in electrical communication with each other using connection 1012, such as a bus. The example computing-device architecture 1000 includes a processing unit (CPU or processor) 1002 and computing device connection 1012 that couples various computing device components including computing device memory 1010, such as read only memory (ROM) 1008 and random-access memory (RAM) 1006, to processor 1002.

Computing-device architecture 1000 can include a cache of high-speed memory connected directly with, in close proximity to, or integrated as part of processor 1002. Computing-device architecture 1000 can copy data from memory 1010 and/or the storage device 1014 to cache 1004 for quick access by processor 1002. In this way, the cache can provide a performance boost that avoids processor 1002 delays while waiting for data. These and other modules can control or be configured to control processor 1002 to perform various actions. Other computing device memory 1010 may be available for use as well. Memory 1010 can include multiple different types of memory with different performance characteristics. Processor 1002 can include any general-purpose processor and a hardware or software service, such as service 1 1016, service 2 1018, and service 3 1020 stored in storage device 1014, configured to control processor 1002 as well as a special-purpose processor where software instructions are incorporated into the processor design. Processor 1002 may be a self-contained system, containing multiple cores or processors, a bus, memory controller, cache, etc. A multi-core processor may be symmetric or asymmetric.

To enable user interaction with the computing-device architecture 1000, input device 1022 can represent any number of input mechanisms, such as a microphone for speech, a touch-sensitive screen for gesture or graphical input, keyboard, mouse, motion input, speech and so forth. Output device 1024 can also be one or more of a number of output mechanisms known to those of skill in the art, such as a display, projector, television, speaker device, etc. In some instances, multimodal computing devices can enable a user to provide multiple types of input to communicate with computing-device architecture 1000. Communication interface 1026 can generally govern and manage the user input and computing device output. There is no restriction on operating on any particular hardware arrangement and therefore the basic features here may easily be substituted for improved hardware or firmware arrangements as they are developed.

Storage device 1014 is a non-volatile memory and can be a hard disk or other types of computer readable media which can store data that are accessible by a computer, such as magnetic cassettes, flash memory cards, solid state memory devices, digital versatile disks, cartridges, random-access memories (RAMs) 1006, read only memory (ROM) 1008, and hybrids thereof. Storage device 1014 can include services 1016, 1018, and 1020 for controlling processor 1002. Other hardware or software modules are contemplated. Storage device 1014 can be connected to the computing device connection 1012. In one aspect, a hardware module that performs a particular function can include the software component stored in a computer-readable medium in connection with the necessary hardware components, such as processor 1002, connection 1012, output device 1024, and so forth, to carry out the function.

The term "substantially," in reference to a given parameter, property, or condition, may refer to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific aspects. For example, a system may be implemented on one or more printed circuit boards or other substrates and may have movable or static components. While the below description and examples use the term "system" to describe various aspects of this disclosure, the term "system" is not limited to a specific configuration, type, or number of objects.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks including devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, magnetic or optical disks, USB devices provided with non-volatile memory, networked storage devices, any suitable combination thereof, among others. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C. or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Claim language or other language reciting "at least one processor configured to," "at least one processor being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general-purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium including program code including instructions that, when executed, performs one or more of the methods described above. The computer-readable data storage medium may form part of a computer program product, which may include packaging materials. The computer-readable medium may include memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general-purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices (e.g., a combination of a DSP and a microprocessor), a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. A method for processing data, the method comprising: receiving image data; determining at least one mask based on intensities of pixels of the image data, wherein the at least one mask is indicative of pixels of the image data with intensities that meet at least one luminance threshold; and at least one of: processing a portion of the image data based on the at least one mask; storing the portion of the image data in a memory based on the at least one mask; or all of: storing the at least one mask in the memory; reading the at least one mask from the memory; reading the portion of the image data from the memory based on the at least one mask; and processing the portion of the image data read from the memory.

Aspect 2. The method of aspect 1, wherein the image data includes first image data and second image data, and wherein the at least one mask is indicative of pixels of the first image data with an intensity that is greater than a darkness threshold and indicative of pixels of the second image data with an intensity that is less than a brightness threshold.

Aspect 3. The method of aspect 2, wherein the first image data is associated with a first exposure, and the second image data is associated with a second exposure that is greater than the first exposure.

Aspect 4. The method of any one of aspects 2 or 3, wherein processing the portion of the image data based on the at least one mask comprises processing the pixels of the first image data with respective intensities that are greater than a darkness threshold as indicated by the at least one mask and processing the pixels of the second image data with respective intensities that are less than a brightness threshold as indicated by the at least one mask.

Aspect 5. The method of any one of aspects 2 to 4, wherein storing the portion of the image data in the memory based on the at least one mask comprises storing the pixels of the first image data with respective intensities that are greater than a darkness threshold, as indicated by the at least one mask, in the memory and storing the pixels of the second image data with respective intensities that are less than a brightness threshold, as indicated by the at least one mask, in the memory.

Aspect 6. The method of any one of aspects 2 to 5, wherein reading the portion of the image data from the memory based on the at least one mask comprises reading the pixels of the first image data with respective intensities that are greater than a darkness threshold, as indicated by the at least one mask, from the memory and reading the pixels of the second image data with respective intensities that are less than a brightness threshold, as indicated by the at least one mask, from the memory.

Aspect 7. The method of any one of aspects 2 to 6, further comprising combining the first image data read from the memory and the second image data read from the memory to generate composite image data.

Aspect 8. The method of any one of aspects 2 to 7, wherein the at least one mask comprises a first mask indicative of pixels of the first image data with an intensity that is greater than a darkness threshold and a second mask indicative of pixels of the second image data with an intensity that is less than a brightness threshold.

Aspect 9. The method of any one of aspects 2 to 8, wherein the at least one mask comprises a mask indicative of pixels of the first image data with an intensity that is greater than a darkness threshold and indicative of pixels of the second image data with an intensity that is less than a brightness threshold.

Aspect 10. The method of any one of aspects 2 to 9, wherein the at least one mask is indicative of groups of pixels of the first image data with an intensity that is greater than a darkness threshold and groups of pixels of the second image data with an intensity that is less than a brightness threshold.

Aspect 11. The method of any one of aspects 2 to 10, wherein: the image data includes third image data; and the at least one mask is indicative of pixels of the third image data with an intensity that is greater than the darkness threshold and less than the brightness threshold.

Aspect 12. The method of any one of aspects 1 to 11, wherein processing the portion of the image data based on the at least one mask comprises processing the portion of the image data as it is received.

Aspect 13. The method of any one of aspects 1 to 12, wherein processing the portion of the image data based on the at least one mask comprises processing less than an entirety of the image data based on the at least one mask.

Aspect 14. The method of any one of aspects 1 to 13, wherein storing the portion of the image data in the memory based on the at least one mask comprises storing less than an entirety of the image data in the memory based on the at least one mask.

Aspect 15. The method of any one of aspects 1 to 14, further comprising storing an entirety of the image data in the memory; wherein reading the portion of the image data from the memory based on the at least one mask comprises reading less than the entirety of the image data from the memory based on the at least one mask.

Aspect 16. The method of any one of aspects 1 to 15, further comprising: prior to storing the portion of the image data in the memory, compressing the portion of the image data based on the at least one mask; and after reading the portion of stored image data from the memory, decompressing the portion of the image data based on the at least one mask.

Aspect 17. The method of any one of aspects 1 to 16, wherein storing the portion of the image data comprises storing respective color values and a respective luma value for each pixel of the portion of the image data and storing a respective luma value for each pixel of a remainder of the image data.

Aspect 18. The method of aspect 17, wherein storing the respective luma value for each pixel of the remainder of the image data comprises storing least-significant bits of the respective luma value.

Aspect 19. The method of any one of aspects 1 to 18, wherein the image data is raw image data.

Aspect 20. A method for processing data, the method comprising: receiving image data; determining at least one mask based on intensities of pixels of the image data, wherein the at least one mask is indicative of pixels of the image data with intensities that meet at least one luminance threshold; and processing a portion of the image data based on the at least one mask.

Aspect 21. The method of aspect 20, wherein: the image data includes first image data and second image data; the at least one mask is indicative of pixels of the first image data with an intensity that is greater than a darkness threshold and indicative of pixels of the second image data with an intensity that is less than a brightness threshold; processing the portion of the image data based on the at least one mask comprises processing the pixels of the first image data with respective intensities that are greater than the darkness threshold as indicated by the at least one mask and processing the pixels of the second image data with respective intensities that are less than the brightness threshold as indicated by the at least one mask.

Aspect 22. The method of any one of aspects 20 or 21, wherein processing the portion of the image data based on the at least one mask comprises processing the portion of the image data as it is received.

Aspect 23. The method of any one of aspects 20 to 22, wherein processing the portion of the image data based on the at least one mask comprises processing less than an entirety of the image data based on the at least one mask.

Aspect 24. A method for processing data, the method comprising: receiving image data; determining at least one mask based on intensities of pixels of the image data, wherein the at least one mask is indicative of pixels of the image data with intensities that meet at least one luminance threshold; and storing a portion of the image data in a memory based on the at least one mask.

Aspect 25. The method of aspect 24, wherein: the image data includes first image data and second image data; the at least one mask is indicative of pixels of the first image data with an intensity that is greater than a darkness threshold and indicative of pixels of the second image data with an intensity that is less than a brightness threshold; storing the portion of the image data in the memory based on the at least one mask comprises storing the pixels of the first image data with respective intensities that are greater than the darkness threshold, as indicated by the at least one mask, in the memory and storing the pixels of the second image data with respective intensities that are less than the brightness threshold, as indicated by the at least one mask, in the memory.

Aspect 26. The method of any one of aspects 24 or 25, wherein storing the portion of the image data in the memory based on the at least one mask comprises storing less than an entirety of the image data in the memory based on the at least one mask.

Aspect 27. A method for processing data, the method comprising: receiving image data; determining at least one mask based on intensities of pixels of the image data, wherein the at least one mask is indicative of pixels of the image data with intensities that meet at least one luminance threshold; storing the image data in a memory; storing the at least one mask in the memory; reading the at least one mask from the memory; reading a portion of the image data from the memory based on the at least one mask; and processing the portion of the image data read from the memory.

Aspect 28. The method of aspect 27, wherein: the image data includes first image data and second image data; the at least one mask is indicative of pixels of the first image data with an intensity that is greater than a darkness threshold and indicative of pixels of the second image data with an intensity that is less than a brightness threshold; reading the portion of the image data from the memory based on the at least one mask comprises reading the pixels of the first image data with respective intensities that are greater than the darkness threshold, as indicated by the at least one mask, from the memory and reading the pixels of the second image data with respective intensities that are less than the brightness threshold, as indicated by the at least one mask, from the memory.

Aspect 29. The method of any one of aspects 27 or 28, wherein storing the image data in the memory comprises storing an entirety of the image data in the memory and wherein reading the portion of the image data from the memory based on the at least one mask comprises reading less than the entirety of the image data from the memory based on the at least one mask.

Aspect 30. The method of any one of aspects 27 to 29, wherein storing the image data in the memory comprises storing the portion of the image data in the memory.

Aspect 31. A non-transitory computer-readable storage medium having stored thereon instructions that, when executed by at least one processor, cause the at least one processor to perform operations according to any of aspects 1 to 30.

Aspect 32. An apparatus for providing virtual content for display, the apparatus comprising one or more means for perform operations according to any of aspects 1 to 30.

What is claimed is:

1. A method for processing data, the method comprising:
receiving image data;
determining at least one mask based on intensities of pixels of the image data, wherein the at least one mask is indicative of pixels of the image data with intensities that meet at least one luminance threshold; and
at least one of:
processing a portion of the image data based on the at least one mask;
storing the portion of the image data in a memory based on the at least one mask; or all of:
storing the at least one mask in the memory;
reading the at least one mask from the memory;
reading the portion of the image data from the memory based on the at least one mask; and
processing the portion of the image data read from the memory;
wherein the portion of the image data includes less than an entirety of the image data.

2. The method of claim 1, wherein the image data includes first image data and second image data, and wherein the at least one mask is indicative of pixels of the first image data with an intensity that is greater than a darkness threshold and indicative of pixels of the second image data with an intensity that is less than a brightness threshold.

3. The method of claim 2, wherein the first image data is associated with a first exposure, and the second image data is associated with a second exposure that is greater than the first exposure.

4. The method of claim 2, wherein processing the portion of the image data based on the at least one mask comprises processing the pixels of the first image data with respective intensities that are greater than a darkness threshold as indicated by the at least one mask and processing the pixels of the second image data with respective intensities that are less than a brightness threshold as indicated by the at least one mask.

5. The method of claim 2, wherein storing the portion of the image data in the memory based on the at least one mask comprises storing the pixels of the first image data with respective intensities that are greater than a darkness threshold, as indicated by the at least one mask, in the memory and storing the pixels of the second image data with respective intensities that are less than a brightness threshold, as indicated by the at least one mask, in the memory.

6. The method of claim 2, wherein reading the portion of the image data from the memory based on the at least one mask comprises reading the pixels of the first image data with respective intensities that are greater than a darkness threshold, as indicated by the at least one mask, from the memory and reading the pixels of the second image data with respective intensities that are less than a brightness threshold, as indicated by the at least one mask, from the memory.

7. The method of claim 2, further comprising combining the first image data read from the memory and the second image data read from the memory to generate composite image data.

8. The method of claim 2, wherein the at least one mask comprises a first mask indicative of pixels of the first image data with an intensity that is greater than a darkness threshold and a second mask indicative of pixels of the second image data with an intensity that is less than a brightness threshold.

9. The method of claim 2, wherein the at least one mask comprises a mask indicative of pixels of the first image data with an intensity that is greater than a darkness threshold and indicative of pixels of the second image data with an intensity that is less than a brightness threshold.

10. The method of claim 2, wherein the at least one mask is indicative of groups of pixels of the first image data with an intensity that is greater than a darkness threshold and groups of pixels of the second image data with an intensity that is less than a brightness threshold.

11. The method of claim 2, wherein:
the image data includes third image data; and
the at least one mask is indicative of pixels of the third image data with an intensity that is greater than the darkness threshold and less than the brightness threshold.

12. The method of claim 1, wherein processing the portion of the image data based on the at least one mask comprises processing the portion of the image data as it is received.

13. The method of claim 1, further comprising storing an entirety of the image data in the memory, wherein reading the portion of the image data from the memory based on the at least one mask comprises reading less than the entirety of the image data from the memory based on the at least one mask.

14. The method of claim 1, further comprising:
prior to storing the portion of the image data in the memory, compressing the portion of the image data based on the at least one mask; and
after reading the portion of stored image data from the memory, decompressing the portion of the image data based on the at least one mask.

15. The method of claim 1, wherein storing the portion of the image data comprises storing respective color values and a respective luma value for each pixel of the portion of the image data and storing a respective luma value for each pixel of a remainder of the image data.

16. The method of claim 1, wherein storing the respective luma value for each pixel of the remainder of the image data comprises storing least-significant bits of the respective luma value.

17. The method of claim 1, wherein the image data is raw image data.

18. A method for processing data, the method comprising:
receiving image data;
determining at least one mask based on intensities of pixels of the image data, wherein the at least one mask is indicative of pixels of the image data with intensities that meet at least one luminance threshold;
processing a portion of the image data based on the at least one mask; and
storing the portion of the image data in a memory;
wherein the portion of the image data includes less than an entirety of the image data.

19. The method of claim 18, wherein:
the image data includes first image data and second image data;
the at least one mask is indicative of pixels of the first image data with an intensity that is greater than a darkness threshold and indicative of pixels of the second image data with an intensity that is less than a brightness threshold; and
processing the portion of the image data based on the at least one mask comprises processing the pixels of the first image data with respective intensities that are greater than the darkness threshold as indicated by the at least one mask and processing the pixels of the second image data with respective intensities that are less than the brightness threshold as indicated by the at least one mask.

20. The method of claim 19, wherein processing the portion of the image data based on the at least one mask comprises processing the portion of the image data as it is received.

21. A method for processing data, the method comprising:
receiving image data;
determining at least one mask based on intensities of pixels of the image data, wherein the at least one mask is indicative of pixels of the image data with intensities that meet at least one luminance threshold; and
storing a portion of the image data in a memory based on the at least one mask, wherein the portion of the image data includes less than an entirety of the image data.

22. The method of claim 21, wherein:
the image data includes first image data and second image data;

the at least one mask is indicative of pixels of the first image data with an intensity that is greater than a darkness threshold and indicative of pixels of the second image data with an intensity that is less than a brightness threshold; and
storing the portion of the image data in the memory based on the at least one mask comprises storing the pixels of the first image data with respective intensities that are greater than the darkness threshold, as indicated by the at least one mask, in the memory and storing the pixels of the second image data with respective intensities that are less than the brightness threshold, as indicated by the at least one mask, in the memory.

23. A method for processing data, the method comprising:
receiving image data;
determining at least one mask based on intensities of pixels of the image data, wherein the at least one mask is indicative of pixels of the image data with intensities that meet at least one luminance threshold;
storing the image data in a memory;
storing the at least one mask in the memory;
reading the at least one mask from the memory;
reading a portion of the image data from the memory based on the at least one mask; and
processing the portion of the image data read from the memory.

24. The method of claim 23, wherein:
the image data includes first image data and second image data;
the at least one mask is indicative of pixels of the first image data with an intensity that is greater than a darkness threshold and indicative of pixels of the second image data with an intensity that is less than a brightness threshold; and
reading the portion of the image data from the memory based on the at least one mask comprises reading the pixels of the first image data with respective intensities that are greater than the darkness threshold, as indicated by the at least one mask, from the memory and reading the pixels of the second image data with respective intensities that are less than the brightness threshold, as indicated by the at least one mask, from the memory.

25. The method of claim 23, wherein storing the image data in the memory comprises storing an entirety of the image data in the memory and wherein reading the portion of the image data from the memory based on the at least one mask comprises reading less than the entirety of the image data from the memory based on the at least one mask.

26. The method of claim 23, wherein storing the image data in the memory comprises storing the portion of the image data in the memory.

* * * * *